United States Patent
Das et al.

(10) Patent No.: US 12,205,417 B2
(45) Date of Patent: Jan. 21, 2025

(54) MISBEHAVIOR DETECTION USING SENSOR SHARING AND COLLECTIVE PERCEPTION

(71) Applicant: QUALCOMM Incorporated, San Diego, CA (US)

(72) Inventors: Soumya Das, San Diego, CA (US); Mohammad Nekoui, San Diego, CA (US); Jonathan Petit, Wenham, MA (US); Dan Vassilovski, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 399 days.

(21) Appl. No.: 17/455,374

(22) Filed: Nov. 17, 2021

(65) Prior Publication Data

US 2023/0154248 A1    May 18, 2023

(51) Int. Cl.
*G07C 5/08* (2006.01)
*G01S 7/00* (2006.01)
*G05D 1/00* (2006.01)
*G06V 20/56* (2022.01)
*H04W 4/40* (2018.01)

(52) U.S. Cl.
CPC ............ *G07C 5/0808* (2013.01); *G01S 7/003* (2013.01); *G05D 1/024* (2013.01); *G06V 20/56* (2022.01); *H04W 4/40* (2018.02)

(58) Field of Classification Search
CPC ...... G07C 5/0808; G01S 7/003; G05D 1/024; G06V 20/56; H04W 4/40; H04W 4/38; H04W 12/009; H04W 12/122; H04W 12/126; H04W 12/65; H04W 12/71
See application file for complete search history.

(56) References Cited

U.S. PATENT DOCUMENTS

| | | | | |
|---|---|---|---|---|
| 7,321,305 | B2* | 1/2008 | Gollu ................... | G06Q 10/087 705/28 |
| 7,720,580 | B2* | 5/2010 | Higgins-Luthman ........ | H04N 25/76 701/28 |
| 8,660,735 | B2* | 2/2014 | Tengler ............... | G06V 20/597 701/32.7 |
| 9,868,446 | B1* | 1/2018 | Zhu ........................ | G01D 18/00 |

(Continued)

FOREIGN PATENT DOCUMENTS

EP          3557893 B1     2/2021

OTHER PUBLICATIONS

Hurl B., et al., "TruPercept: Trust Modelling for Autonomous Vehicle Cooperative Perception from Synthetic Data", IEEE Intelligent Vehicles Symposium (IV), Las Vegas, USA, Oct. 20-23, 2020, pp. 341-347, XP033873007, DOI: 10.1109/IV47402.2020.9304695, Section III.B.

(Continued)

*Primary Examiner* — Donald J Wallace
(74) *Attorney, Agent, or Firm* — Polsinelli LLP

(57) ABSTRACT

Systems and techniques are described for validating object detection. For example, an apparatus can receive a message from a wireless device. The message includes object data corresponding to one or more objects reported by the wireless device to be within a field-of-view of the apparatus. The apparatus can further determine, based on the object data, whether the wireless device has misreported at least one of the one or more objects.

29 Claims, 18 Drawing Sheets

(56) References Cited

U.S. PATENT DOCUMENTS

| | | | | |
|---|---|---|---|---|
| 2012/0208456 A1* | 8/2012 | Hill | ............... | H04B 5/72 |
| | | | | 455/41.1 |
| 2019/0325751 A1* | 10/2019 | Altintas | ............... | G05D 1/0077 |
| 2020/0064456 A1* | 2/2020 | Xu | ............... | G01S 13/765 |
| 2020/0405223 A1* | 12/2020 | Mai | ............... | H04B 1/713 |
| 2020/0410305 A1* | 12/2020 | Ohyama | ............... | G01S 17/89 |
| 2021/0044957 A1* | 2/2021 | Norp | ............... | H04W 8/18 |
| 2023/0154249 A1* | 5/2023 | Das | ............... | G06V 20/56 |
| | | | | 701/31.4 |

OTHER PUBLICATIONS

International Search Report and Wriiten Opinion—PCT/US20221078450—ISA/EPO—Feb. 1, 2023.
Liu X., et al., "MISO-V: Misbehavior Detection for Collective Perception Services in Vehicular Communications", IEEE Intelligent Vehicles Symposium (IV), Nagoya, Japan, Jul. 11-17, 2021, pp. 369-376, XP034005588, DOI: 10.1109/IV48863.2021.9575970, Section III.D.

* cited by examiner

MISBEHAVIOR DETECTION USING SENSOR SHARING AND COLLECTIVE PERCEPTION

FIELD

The present disclosure relates generally to communication systems. For example, aspects of the present disclosure relate to a configuration for detecting misbehaving wireless devices using sensor sharing and collective perception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for identifying misbehaving wireless devices. According to at least one example, an apparatus for validating object detection, the apparatus comprising: at least one transceiver; at least one memory; and at least one processor coupled to the at least one transceiver and the at least one memory, the at least one processor configured to: receive via the at least one transceiver, a first message from a wireless device, wherein the first message comprises object data corresponding to one or more objects reported by the wireless device to be within a field-of-view of the apparatus; and determine whether the wireless device has misreported at least one of the one or more objects, based on the detected object data.

In another example, a method for validating object detection is provided. The method can include: receiving a first message from a wireless device, wherein the first message comprises object data corresponding to one or more objects reported by the wireless device to be within a field-of-view of an apparatus; and determining whether the wireless device has misreported at least one of the one or more objects, based on the detected object data.

In another example, a non-transitory computer-readable storage medium is provided that comprises at least one instruction for causing a computer or processor to: receive a first message from a wireless device, wherein the first message comprises object data corresponding to one or more objects reported by the wireless device to be within a field-of-view of an apparatus; and determine whether the wireless device has misreported at least one of the one or more objects, based on the detected object data.

In another example, an apparatus for validating object detection is provided. In some examples the apparatus can include: means for receiving a first message from a wireless device, wherein the first message comprises object data corresponding to one or more objects reported by the wireless device to be within a field-of-view of the apparatus; and means for determining whether the wireless device has misreported at least one of the one or more objects, based on the detected object data.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, a robotics device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
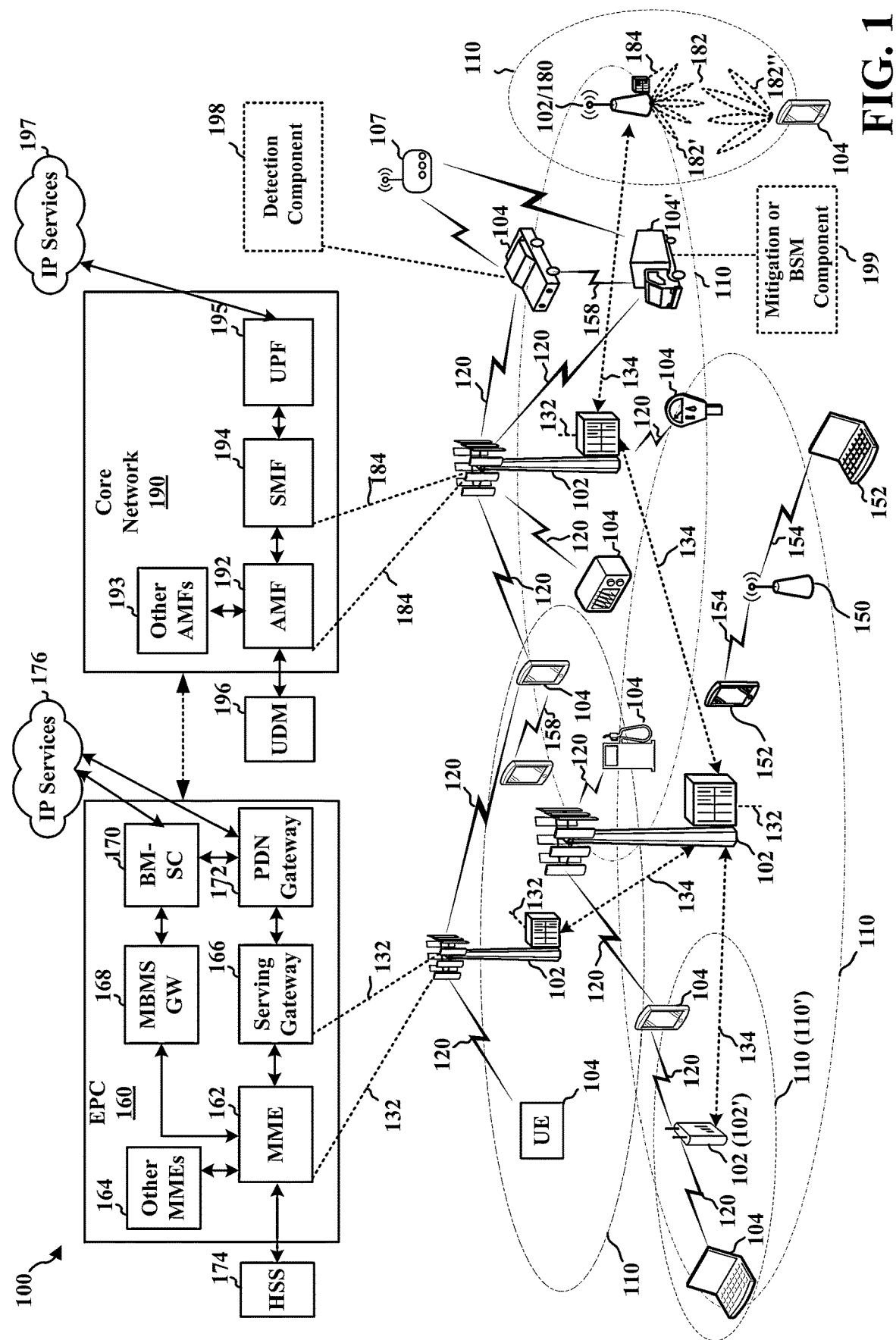
FIG. 1 is a diagram illustrating an example of a wireless communications system and an access network.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Aspects of the present disclosure relate to features for improving cooperative and automated driving decisions. For instance, as described in more detail herein, vehicles (or other wireless devices) may report inaccurate information about the presence of detected objects. For example, a vehicle or other wireless device may incorrectly report the presence of a non-existing object or may report attributes about an existing object that are incorrect. Some such misreporting instances may be performed by malicious entities, while others may be due to perception errors associated with the reporting entity. For instance, a malicious entity may perform such an attack to use up channel resources and/or effectively launch a Denial-of-Service (DoS) type of attack and/or provide erroneous inputs to the surrounding vehicles to throw off their sensor fusion engine(s). Such an attach may potentially endanger cooperative and automated driving decisions, which a primary goal that sensor sharing and collective perception systems.

Systems, apparatuses, processes (also referred to as methods), and computer-readable media (collectively referred to herein as systems and techniques) are described herein for identifying the misreporting of objects by various wireless entities/devices (e.g., vehicles or other wireless devices), and in some instances, for identifying and reporting the misbehaving entities/devices. Erroneous object reporting can be communicated to other entities, such as other vehicles, and/or cloud infrastructure, such as a Service Control Management Suite (SCMS), and/or other network entities responsible for managing SDSM/CPM misbehavior. Aspects of the disclosed technology provide collaborative solutions for directly and indirectly identifying misbehaving/roque V2X entities, which can improve the accuracy and safety of cooperative and automated driving decisions.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Figure 2:
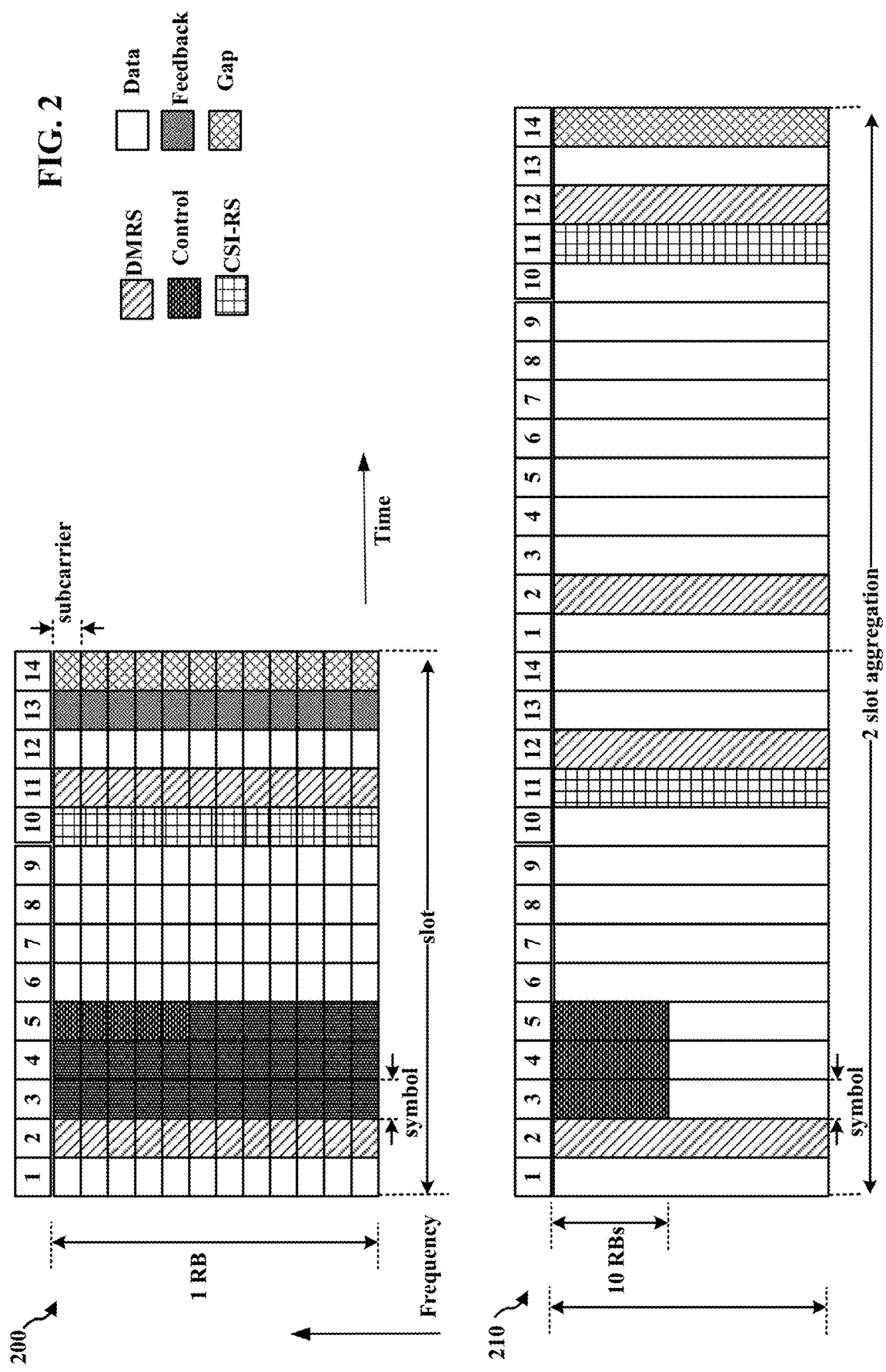
FIG. 2 illustrate example aspects of a sidelink slot structure, in accordance with some aspects of the present disclosure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
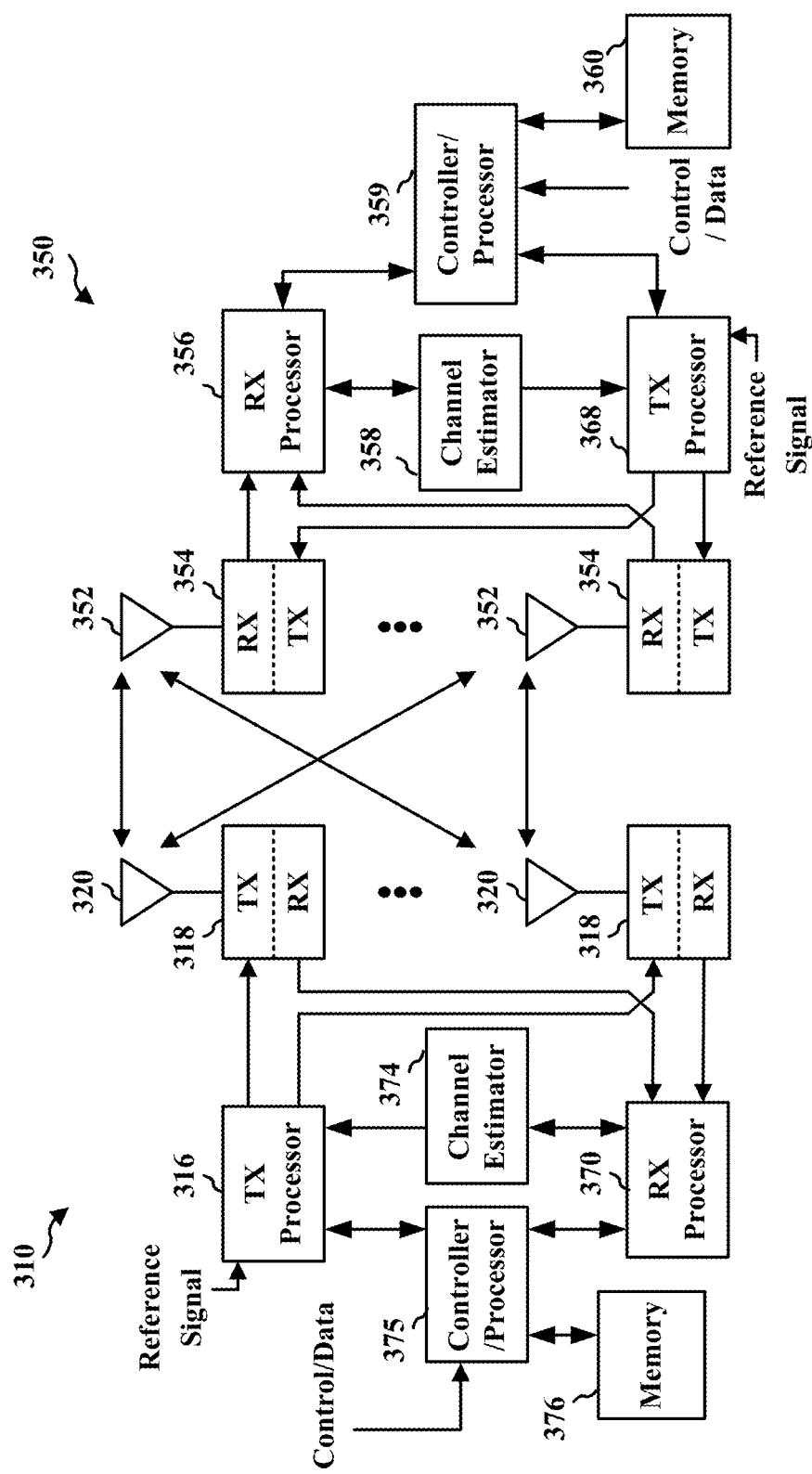
FIG. 3 is a diagram illustrating an example of a first device and a second device involved in wireless communications (e.g., V2V communications, V2X communications, and/or other device-to-device communication), in accordance with some aspects of the present disclosure.

FIG. 3 is a block diagram 300 of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 4:
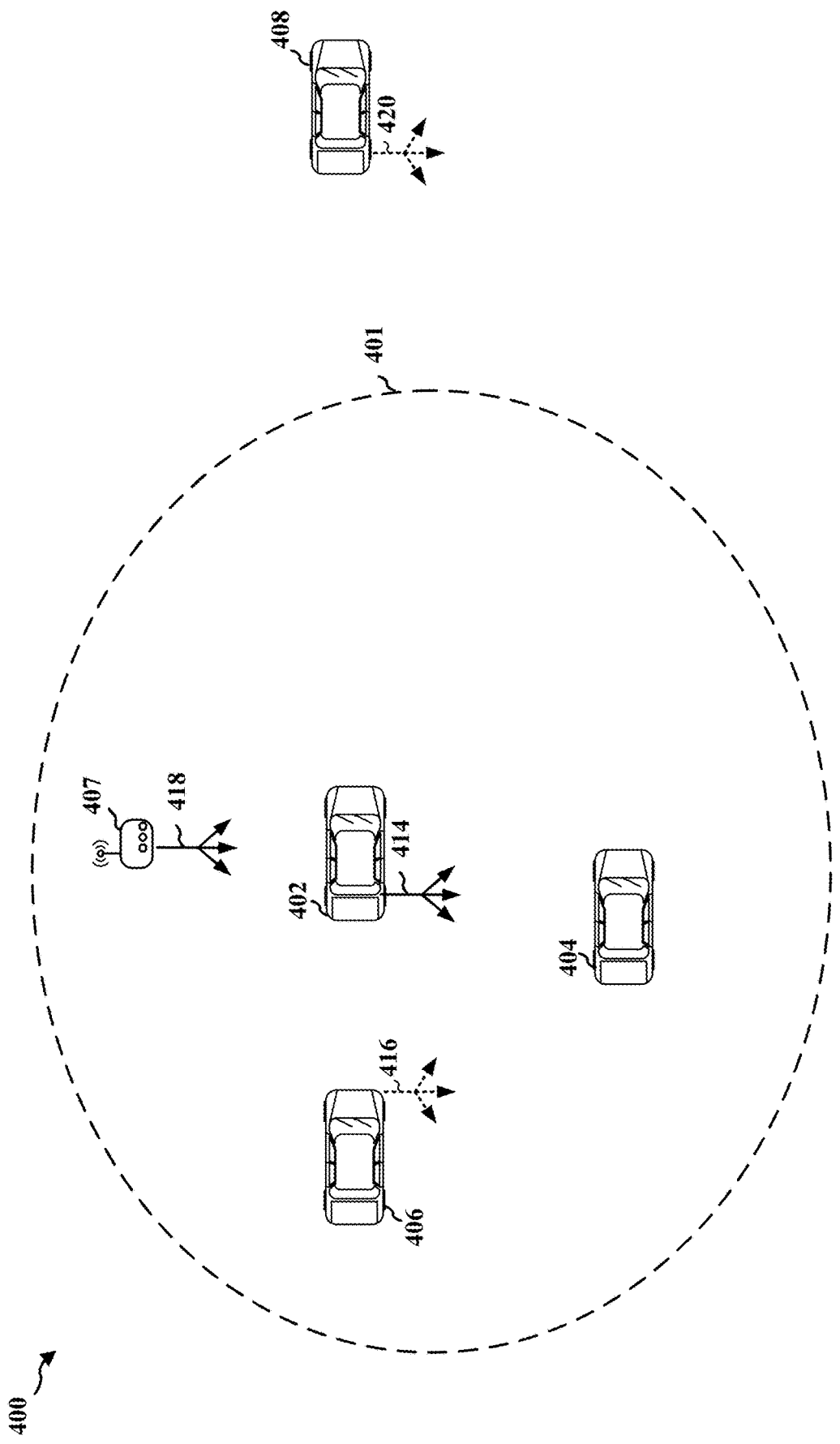
FIG. 4 is a diagram illustrating an example of devices involved in wireless communications (e.g., sidelink communications), in accordance with some aspects of the present disclosure.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 (and 418 by RSU 407) may be broadcast or multicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408.

UE 402, 404, 406, 408 or RSU 407 may comprise a detection component, similar to 198 described in connection with FIG. 1. UE 402, 404, 406, 408 or RSU 407 may also comprise a BSM or mitigation component, similar to 199 described in connection with FIG. 1.

Figure 5A:
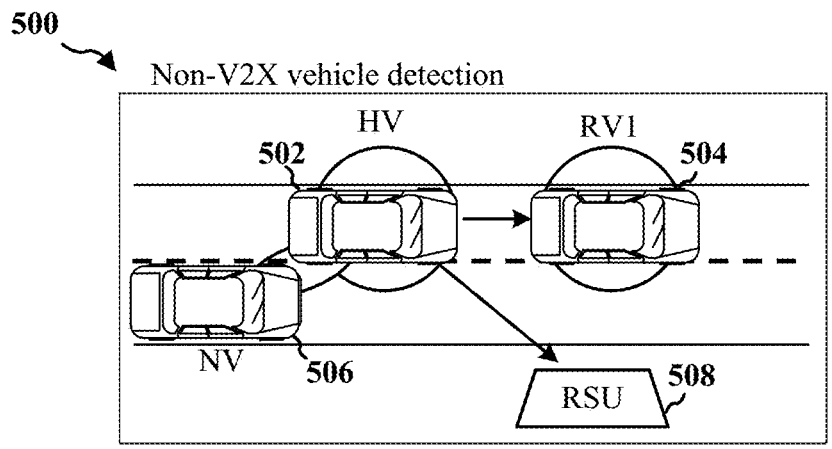
FIGS. 5A-5D are diagrams illustrating examples of sensor-sharing for cooperative and automated driving systems, in accordance with some aspects of the present disclosure.
Figure 5B:
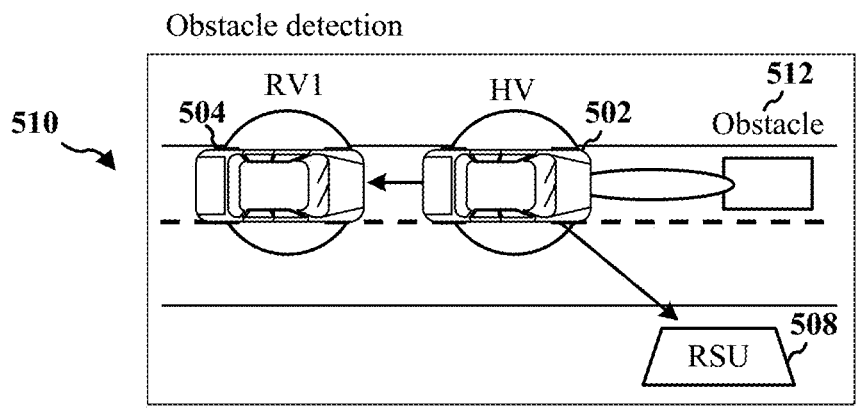
Figure 5C:
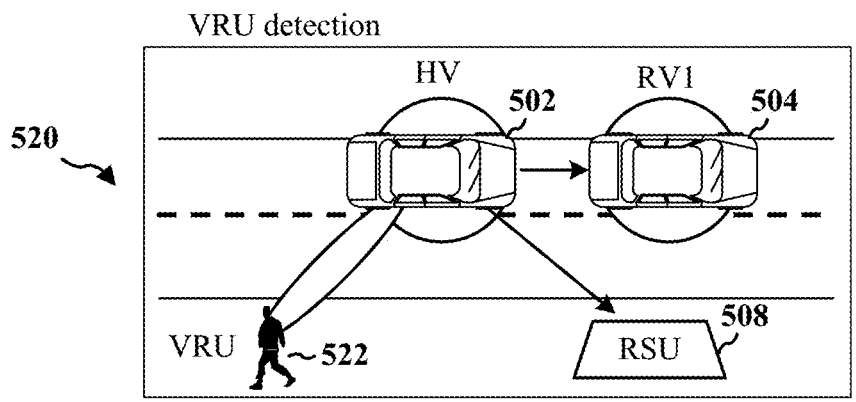
Figure 5D:
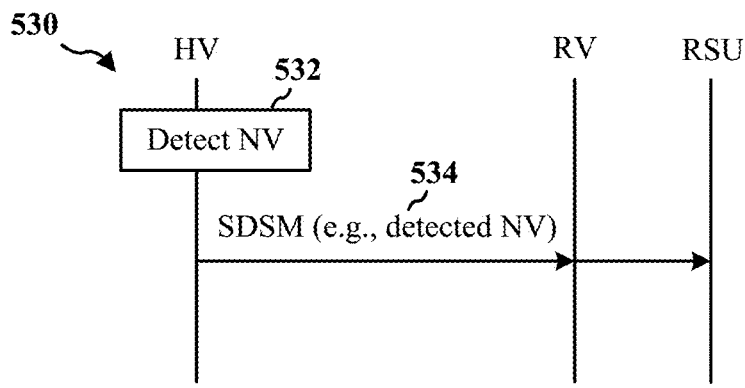
Figure 6:
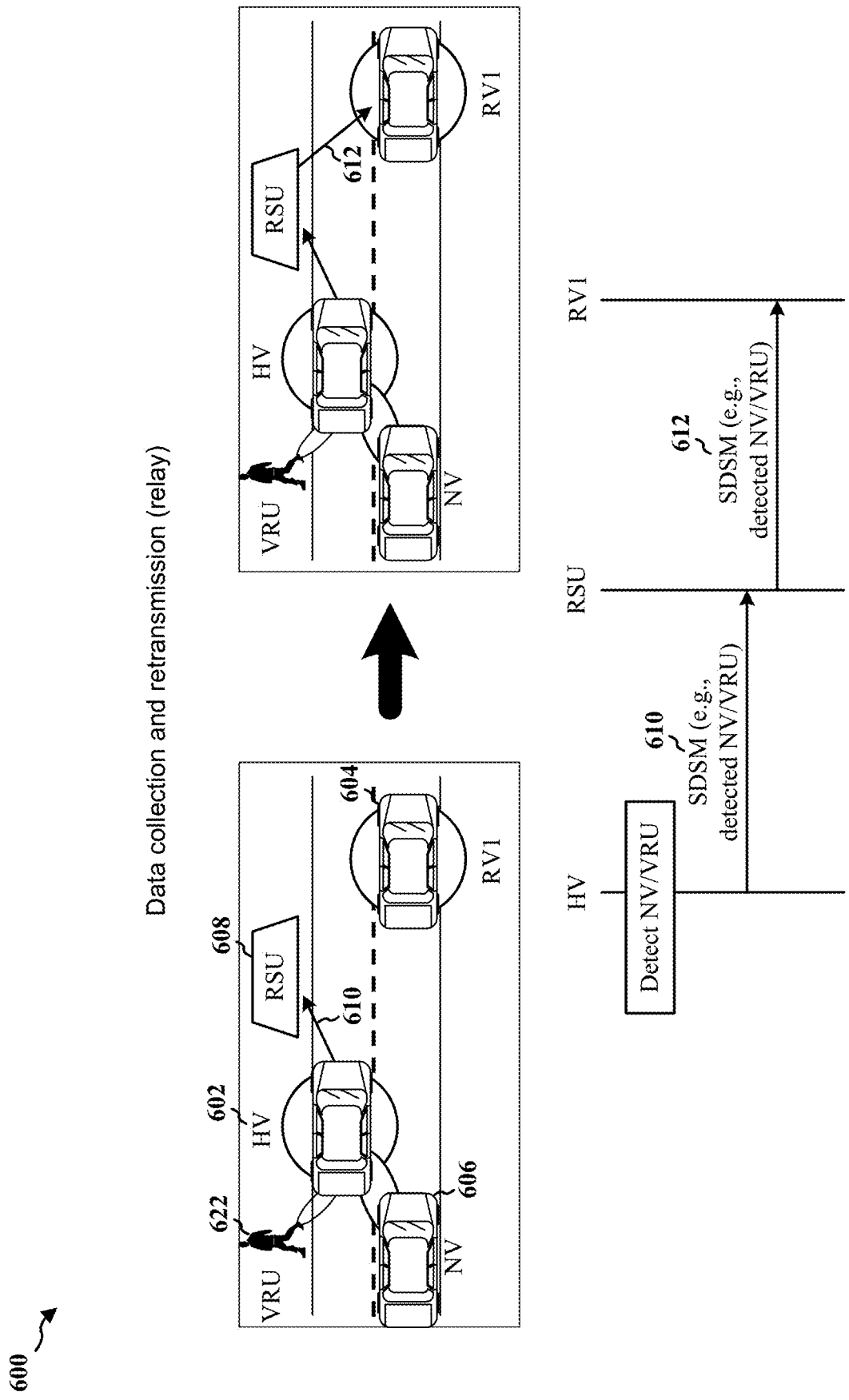
FIG. 6 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 500 of FIG. 5A, the host vehicle (HV) 502 may detect a number of items within its environment. For example, the HV 502 may detect the presence of the non-V2X entity (NV) 506 at block 532. The HV 502 may inform other entities, such as a first remote vehicle (RV1) 504 or a road side unit (RSU) 508, about the presence of the NV 506, if the RV1 504 and/or the RSU 508, by themselves, are unable to detect the NV 506. The HV 502 informing the RV1 504 and/or the RSU 508 about the NV 506 is a sharing of sensor information. With reference to diagram 510 of FIG. 5B, the HV 502 may detect a physical obstacle 512, such as a pothole, debris, or an object that may be an obstruction in the path of the HV 502 and/or RV1 504 that has not yet been detected by RV1 504 and/or RSU 508. The HV 502 may inform the RV1 and/or the RSU 508 of the obstacle 512, such that the obstacle 512 may be avoided. With reference to diagram 520 of FIG. 5C, the HV 502 may detect the presence of a vulnerable road user (VRU) 522 and may share the detection of the VRU 522 with the RV1 504 and the RSU 508, in instances where the RSU 508 and/or RV1 504 may not be able to detect the VRU 522. With reference to diagram 530 of FIG. 5D, the HV, upon detection of a nearby entity (e.g., NV, VRU, obstacle) may transmit a sensor data sharing message (SDSM) 534 to the RV and/or the RSU to share the detection of the entity. The SDSM 534 may be a broadcast message such that any receiving device within the vicinity of the HV may receive the message. In some instances, the shared information may be relayed to other entities, such as RVs. For example, with reference to diagram 600 of FIG. 6, the HV 602 may detect the presence of the NV 606 and/or the VRU 622. The HV 602 may broadcast the SDSM 610 to the RSU 608 to report the detection of NV 606 and/or VRU 622. The RSU 608 may relay the SDSM 610 received from the HV 602 to remote vehicles such that the remote vehicles are aware of the presence of the NV 606 and/or VRU 622. For example, the RSU 608 may transmit an SDSM 612 to the RV1 604, where the SDSM 612 includes information related to the detection of NV 606 and/or VRU 622.

In some cases, vehicles (or other wireless devices) may report inaccurate information about the presence of detected objects in the SDSM 612. For example, SDSM 612 may incorrectly report the presence of a non-existing object or may report attributes about an existing object incorrectly. Although some such misreporting instances may be performed by malicious entities, others may be due to perception errors associated with the reporting entity. For example, vehicles having malfunctioning and/or mis-calibrated sensors may report erroneous information about objects in the environment, without malicious intent.

As noted above, systems and techniques are described herein for identifying the misreporting of objects by various wireless entities/devices, and in some instances, for identifying and reporting the misbehaving entities/devices. Erroneous object reporting can be communicated to other entities, such as other vehicles, and/or cloud infrastructure, such as a Service Control Management Suite (SCMS), and/or other network entities responsible for managing SDSM/CPM misbehavior. Aspects of the disclosed technology provide collaborative solutions for directly and indirectly identifying misbehaving/rogue V2X entities, which can improve the accuracy and safety of cooperative and automated driving decisions.

Figure 7:
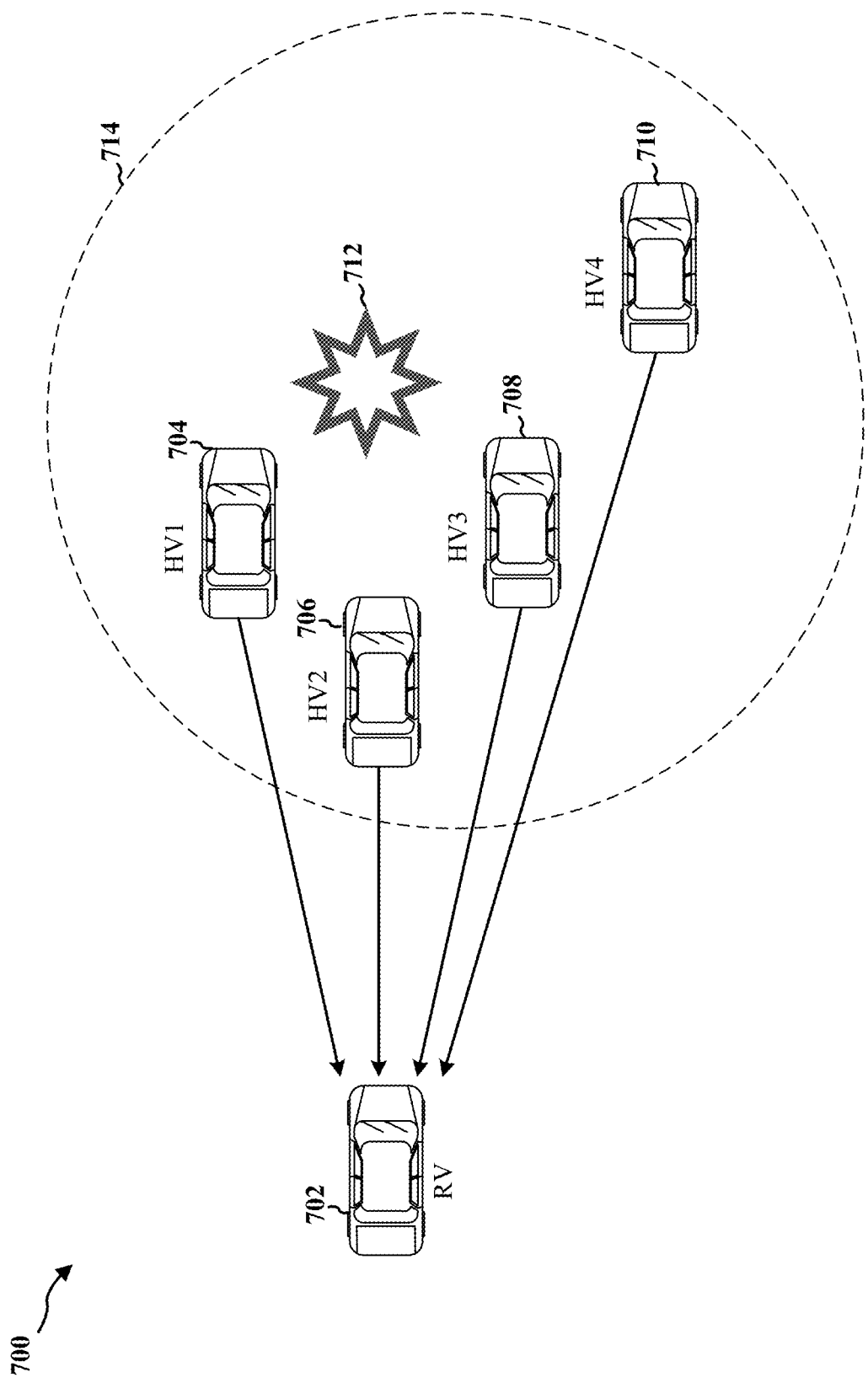
FIG. 7 is a diagram illustrating an example of sensor-sharing for identifying a misbehaving entity, in accordance with some aspects of the present disclosure.

FIG. 7 is a diagram illustrating an example environment 700 in which sensor-sharing can be used for identifying a misbehaving entity. In the example of environment 700, a remote vehicle (RV) 702 is shown to receive various messages (e.g., SDSM/CPM) transmitted from multiple host vehicles (HVs), e.g., HV1 704, HV2 706, HV3 708, and HV4 710. In the illustrated example, RV 702 is located at a position too remote (e.g., out of coverage area or communication range) to directly sense/measure environment 714 that corresponds with a field-of-view (FOV) of HVs 704, 706, 708, and 710. In such instances, RV 702 can utilize SDSMs transmitted by HVs (704, 706, 708, and 710) in order to identify objects detected by one or more sensors of the corresponding vehicle. By way of example, SDSMs received from HVs 704, 706, 708, and 710, can be used by RV 702 to detect, and therefore reason about, various objects in environment 700 that are not directly perceptible by sensors of the RV 702 (e.g., as one or more Light Detection and Ranging (LiDAR), radar, and/or camera sensors, etc.). However, because understanding of the environment 714 by RV 702 is dependent upon received SDSMs, messages sent by rogue/misbehaving entities (e.g., reporting non-existent objects or inaccurate object information) can adversely affect an ability of the RV 702 to accurately reason about environment 714.

In some aspects, various HVs can be equipped to identify misreported objects based on received messages, e.g., SDSM/CPM messages. For example, detected objects that are indicated in a received SDSM can be verified or corroborated using sensor data collected by the verifying vehicle, e.g., the receiving ego vehicle. By way of example, by comparing reported object data with sensor data collected by its own vehicle sensors (e.g., LiDAR, radar, cameras, etc.), HV1 704 can verify that objects reported by other vehicles are, in fact, existing objects. In another illustrative example, in instances where a reported object is present, by comparing reported object data with sensor data collected by its own vehicle sensors, HV1 704 can verify that reported object attributes (e.g., object location, object type, and/or kinematic traits, etc.) have been accurately conveyed.

In some examples, determinations about the validity of reported objects can be used to classify the reporting entity (e.g., as a rogue or misbehaving device) and to report the misbehavior to other entities, such as other V2X vehicles (e.g., via one or more SDSM/CPM transmissions). In some examples, determinations about the validity of reported objects can be used to modify a redundancy mitigation regime, e.g., to increase a frequency of detected object data that is transmitted to other entities/vehicles. For instance, the reporting of misbehaving wireless devices (e.g., vehicles) can be performed via direct reporting, or can be performed indirectly through the modification of a frequency of reporting for other objects in the environment.

Further to the example illustrated in FIG. 7, HV3 708 may be a misbehaving/malicious entity that reports a non-existent object 712, e.g., via one or more messages (SDSM/CPM) broadcast to RV 702, HV1 704, HV3 708, and HV4 710. In the illustrated arrangement, although RV 702 cannot directly validate messages received from HV3 708, e.g., because non-existent object 712 is outside a field-of-view of RV 702, the messages received by HV1 704, HV2 706, and HV4 710 can be validated using their respectively collected sensor data. As such, one or more of HV1 704, HV2 706, and HV4 710 may identify the inaccuracies in reported object data received from HV3 708, classify HV3 708 as a misbehaving entity, and report this classification directly to other vehicles, such as RV 702. In some instances, based on the classification of HV3 708 as a misbehaving entity, subsequent messages received by RV 702 from HV3 can be filtered and/or ignored.

In some examples, object validation may be performed on a per-object basis, for example, certain objects reported by HV3 may be accurately reported, while others may be inaccurately reported. As such, messages generated by other HVs (e.g., HV1 704, HV2 706, and HV4 710), may indicate further details about the objects and/or object attributes reported by HV3 708, such that messages broadcast by HV1 704, HV2 706, and/or HV4 710 about HV3 may indicate the reported inaccuracy, such as inaccuracies in location, object type, etc.), as well as object information directly observed by the validating HV. Information about inaccurate object reporting by a misbehaving device (e.g., HV3 708), may be included in one or more SDSM extension fields, as discussed in further detail with respect to FIGS. 12-14, below.

In some aspects, the identification of misbehaving entities may be indirectly reported, for example, through modifications to a redundancy reporting scheme implemented in response to the detection of inaccurate object reporting by other vehicles. In such implementations, the frequency of reporting of environmental objects can be increased so that entities/vehicles outside of the reported field-of-view, such as RV 702, can make their own inferences regarding the accuracy of object data reported by other entities. Further discussion regarding the relaxation of redundancy reporting regimes is discussed with respect to FIGS. 10 and 11, below.

Figure 8:
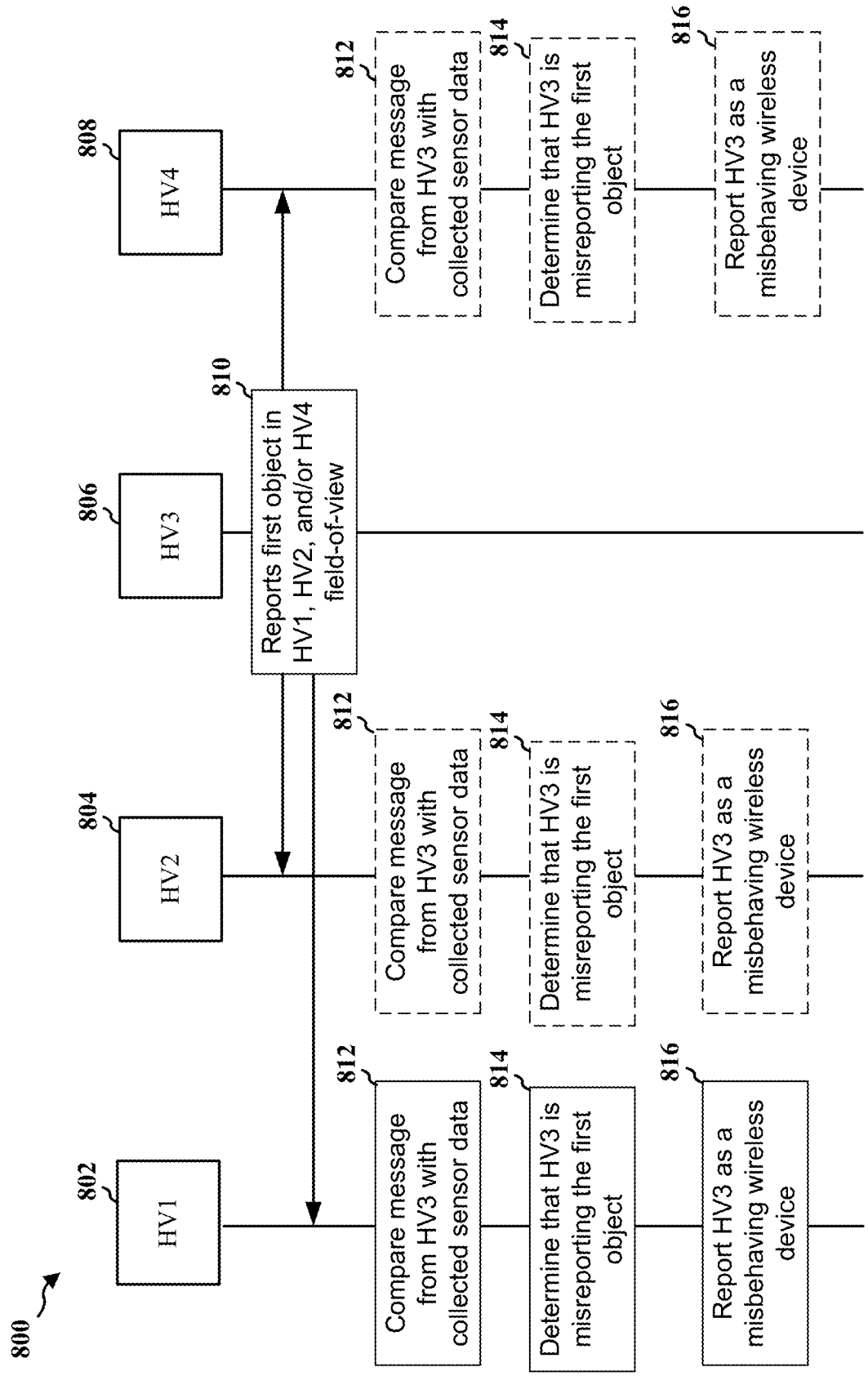
FIG. 8 is a call flow diagram illustrating an example process for identifying a misbehaving entity, in accordance with some aspects of the present disclosure.

FIG. 8 is a call flow diagram 800 of an example process for identifying a misbehaving entity. In the example of FIG. 8, multiple wireless devices, e.g., HV1 802, HV2 804, HV3 806, and HV4 808 are configured to wirelessly transact data about a surrounding environment, such as environment 714, discussed above with respect to FIG. 7. Further to the example of FIG. 7, some or all devices (e.g., HV1 802, HV2 804, HV3 806, and HV4 808) can share a common field-of-view, such that their respective sensors can perceive/measure characteristics of objects in a common location. At block 810, HV3 806 sends a message (e.g., SDSM/CPM) indicating the exitance of a first object in the field-of-view shared by one or more of HV1 802, HV2 804, and/or HV4 808. The message broadcast by HV3 806 can indicate the existence of an object and in some cases one or more other object attributes, such as a location of the reported object, an object type, kinematic attributes of the object, any combination thereof, and/or other attributes.

At block 812, HV1 802 compares the message received from HV3 806 with sensor data collected for the field-of-view that allegedly includes the reported object. As indicated in the example of FIG. 8, similar comparisons can be made by each entity receiving the message from HV3 806, such as HV2 804, and HV4 808. At block 814, HV1 802 can determine if HV3 806 is misreporting the first object. For example, HV1 802 can determine if the first object is indicated in sensor data that is collected/received directly by HV1 802. In instances where the reported object does exist, HV1 802 can also corroborate the accuracy of object attributes reported by HV3 806. In some instances, inaccuracies in object reporting by HV3 806 may automatically result in a determination by HV1 802 that HV3 806 is misbehaving. For example, in instances wherein HV3 806 reports a non-existent object, HV1 802 may automatically determine that HV3 806 is a rogue or misbehaving wireless device. In such instances, messages received by other entities can be used to facilitate such determinations. For example, if messages received by HV1 802 from HV2 804 and/or HV4 808 indicate the existence of the reported object, HV1 802 may determine that HV3 806 is not a misbehaving device. In such scenarios, HV1 802 may instead diagnose/identify a failure of one or more of its own sensors or perception capabilities. In another example, HV3 806 may determine that its sensors are faulty due to the indication that the object is an existing object by HV1 802 based on messages from HV2 804 and/or HV4 808. For instance, in case of faulty sensor of HV3 806, it is likely that the misreported object exists but the reported location/characteristics as detected by the sensor(s) of HV3 806 are not accurate. Modification of redundancy mitigation (e.g., relaxation of redundancy mitigation to transmit more messages), the reported object details can help to identify faulty on-board sensors of a device (e.g., HV3 806). In some aspects, if HV3 806 determines that one or more of its sensors are faulty, HV3 806 can recalibrate (if possible) the one or more faulty sensors and/or can disable the messaging service (e.g., temporarily disabling the SDSM service), such as by alerting a driver of HV3 806 to disable the messaging service (e.g., the SDSM service).

In some aspects, HV3 806 can keep track of the number of occurrences where neighboring vehicles (e.g., HV2 804, HV4 808, or other vehicle) or other devices "disagree" with it over the characteristics of a detected object. The more messages received indicating that the other vehicles or objects disagree with information reported by HV3 806 regarding an object, the more HV3 806 can determine that its own sensors are faulty. When different sets of neighboring devices over time disagree with its determination, HV3 806 can build a confidence score regarding the faultiness of its sensors. Such a solution can help avoid cases where a group of adversary mis-behaving vehicles attempt to make HV3 806 determine that its sensors are faulty.

In other examples, inaccuracies in object reporting by HV3 806 may not be determined to constitute misbehavior by HV3 806. For example, if HV3 806 correctly reports the existence of an object, but reports an incorrect or inaccurate attribute, such as an inaccurate object location, an amount of the reported error may be taken into consideration when determining if HV3 806 is misbehaving. By way of example, inaccuracies in a reported object location may be due to acceptable sensor errors, and may not result determinations that HV3 806 is misbehaving. In such instances, thresholds may be used to determine the limits of acceptable error. For example, if the error in reported object location exceeds a predetermined threshold, (e.g., that exceeds the magnitude of sensor noise or standard sensor measurement errors), HV1 802 may determine that HV3 806 is a misreporting wireless device. As illustrated in the example of FIG. 8, similar determinations can be performed by one or more of the other wireless devices, e.g., HV2 804 and/or HV4 808.

At block 816, if is determined that HV3 806 is misbehaving, HV1 802 can report the misbehaving device, e.g., in one or more SDSM/CPM sent to other entities, such as other vehicles in the same geographic vicinity. In some instances, the detected misbehavior can be reported to one or more remote vehicles (RVs), for example, that are too distant to directly corroborate the accuracy of object reporting received from HV3 806. Further details regarding scenarios involving remote vehicles are discussed with respect to FIGS. 9, 10, and 11, below.

Figure 9:
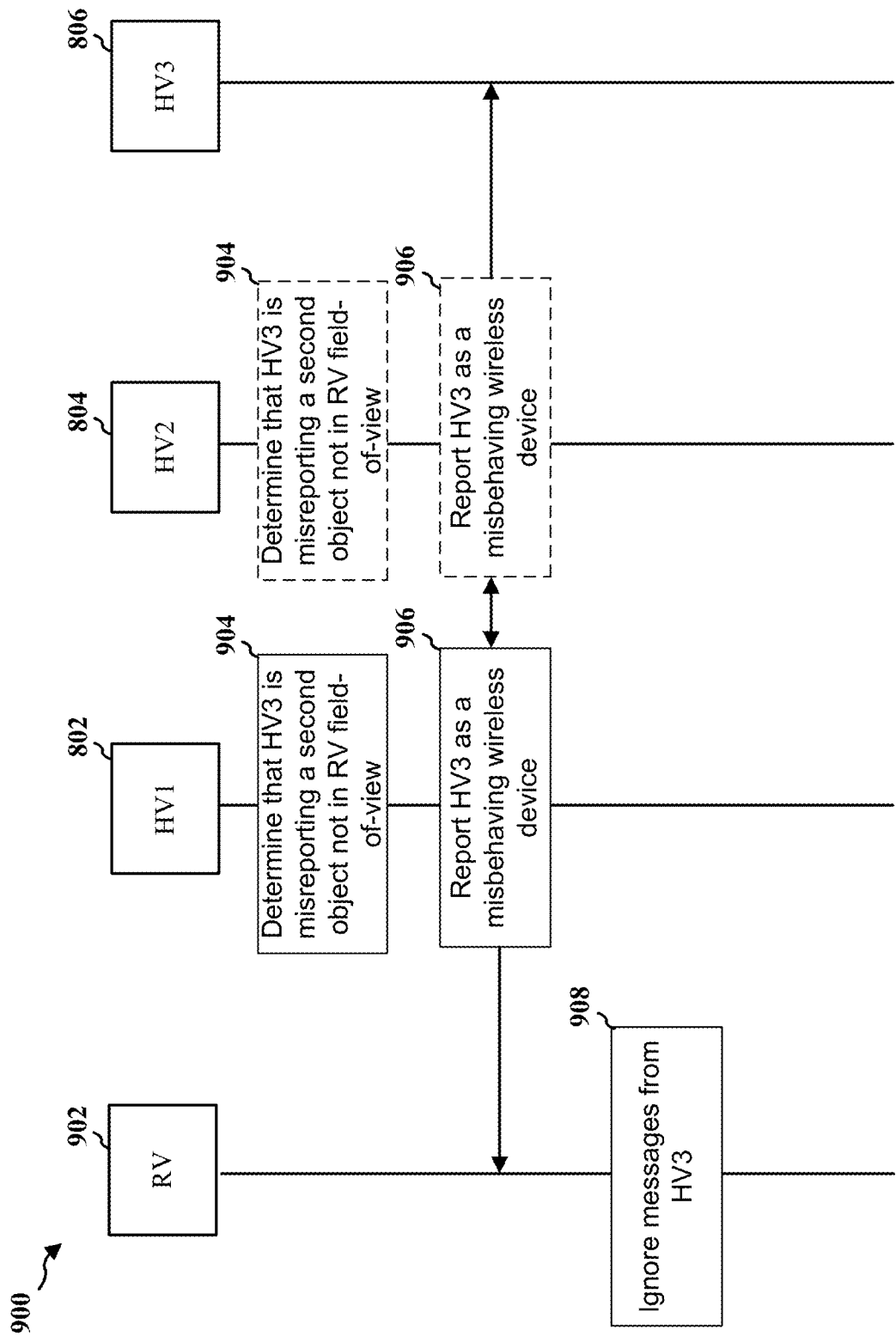
FIG. 9 is a call flow diagram illustrating an example process for reporting a detected misbehaving entity to a remote vehicle, in accordance with some aspects of the present disclosure.

FIG. 9 is a call flow diagram 900 of an example process for reporting a detected misbehaving entity to a remote vehicle (RV). In the example of FIG. 9, remote vehicle (RV) 902 can represent a wireless device/vehicle unable to observe a field-of-view accessible to other devices in the vicinity, such as HV1 802, HV2 804, and/or HV3 806. Similar to the examples discussed above with respect to FIGS. 7 and 8, RV 902 is configured to receive messages (SDSM/CPM) from other devices in order to identify objects outside its field-of-view. In the example of FIG. 9, HV1 802 has determined that HV3 is misreporting the detection of a second object (block 904). In some instances, similar determinations can be made by other similarly situated device, such as HV2 804. In some examples, the detected misreporting by HV3 806 can be broadcast by HV1 802 to other devices, e.g., RV 902, HV2 804, and HV3 806 (block 906). In some examples, the reported misbehavior of HV3 806 may include information identifying the rogue/misbehaving device, as well as information pertaining to the misreported information. For example, when reporting the misbehavior of HV3 806, HV1 802 may include data identifying the reporting error including an object type, object location and/or other misreported attributes. As discussed in further detail below, information detailing the nature of the misreported object can be included in one or more extension fields of the transmitted SDSM/CPM.

Based on the stated misbehavior of HV3 806 by HV1 802 and/or HV2 804, RV 902 can implement a filter on SDSM/CPM reports received from HV3 806 (block 908). In some aspects, RV 902 may ignore all messages originating from HV3 806. In other aspects, RV 902 may selectively filter/ignore reporting for specific objects.

Figure 10:
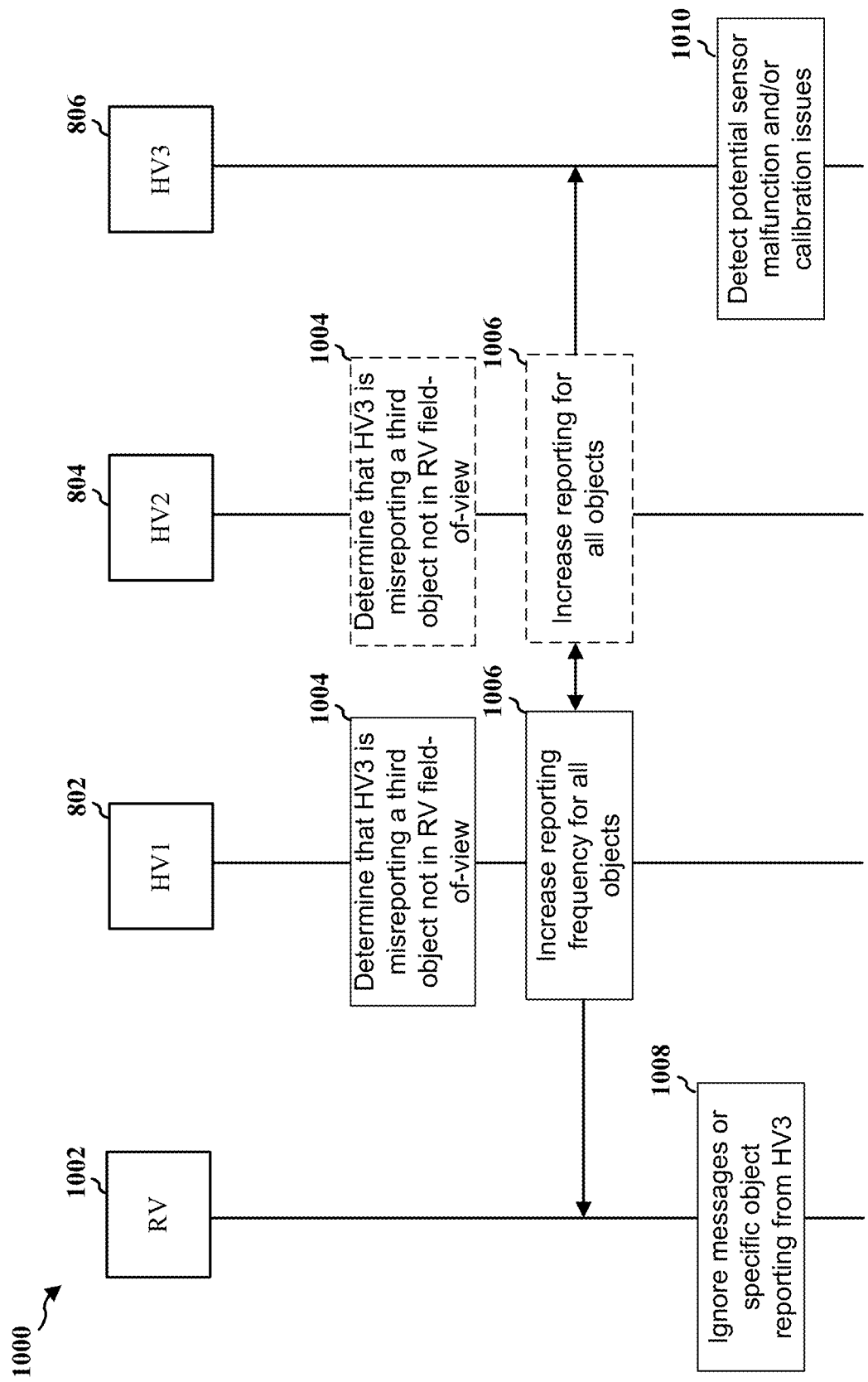
FIG. 10 is a call flow diagram illustrating an example process for modifying a redundancy reporting regime based on the detection of a misbehaving entity, in accordance with some aspects of the present disclosure.

FIG. 10 is a call flow diagram of an example process 1000 for modifying (e.g., relaxing) a redundancy reporting mitigation regime based on the detection of a misbehaving entity. For example, accurate knowledge of road conditions and road users is a prerequisite for V2X entities (e.g., RSUs, vehicles, VRUs, etc.) to arrive at safe and efficient driving decisions. The SAE J3224 standard enhances situational awareness for V2X entities by defining an application-layer message structure and information elements (IEs) to exchange information about detected objects and/or road obstacles to improve cooperative and automated driving decisions. Redundantly sharing information about the same detected object increases the resource utilization and network channel load, which can thus degrade overall system performance. Redundancy reporting mitigation (also referred to as sensor sharing redundancy mitigation) in general is used to reduce or limit the number of V2X entities (e.g., vehicles, RSUs, VRUs, etc.) that are transmitting redundant information about the same object.

Various schemes for redundancy reporting mitigation are available. In one example, a self-announcement (SA) and frequency-based rule can be used for redundancy reporting mitigation. According to the self-announcement and frequency-based rule, for every object in the range of a V2X entity (e.g., a V2X-enabled vehicle), the V2X entity can determine if each object is a non-V2X object. For example, the V2X entity can include information in a message (e.g., an SDSM) only for non-V2X objects, referred to as SA. SA can be used to exclude information for V2X-enabled entities or objects because it can be assumed that V2X-enabled entities will share their own information (e.g., via a Basic Safety Message (BSM) rather than an SDSM). The V2X entity can then apply the frequency-based rule to determine whether it is receiving more than T reports for a given non-V2X object over a window of a given length (e.g., length Y milliseconds (ms)) from neighboring V2X entities in their reporting messages (e.g., SDSMs). If the V2X entity determines that it is receiving more than T reports for a non-V2X object over the window of time in reporting messages (e.g., SDSMs) of neighboring V2X entities, the V2X entity will not include information for the given non-V2X object in its reporting message (e.g., SDSM). If not, the V2X entity will include information for the given non-V2X object in its SDSM.

Another example redundancy reporting mitigation scheme includes a SA and distance-based rule. In addition to SA (e.g., reporting information only for non-V2X objects), a V2X entity can apply the distance-based rule to determine information to exclude from its reporting message (e.g., SDSM). The V2X entity can apply the distance-based rule to determine, over a time window (e.g., Y ms), if it is receiving reports from neighboring V2X entities that are closer to the V2X entity than a threshold distance (e.g., a Euclidean distance), and if yes, the V2X entity will not include that information in its own reporting message (e.g., SDSM). For instance, the V2X entity may only include information for a non-V2X object in its reporting message if the neighbor V2X entity (which is already reporting the information for the same non-V2X object) is further away from the V2X entity than the threshold distance.

Another example redundancy reporting mitigation scheme includes a SA and dynamics-based rule. In addition to SA (e.g., reporting information only for non-V2X objects), a V2X entity can apply the dynamics-based rule to determine to include information for a non-V2X entity in its reporting message (e.g., SDSM) only if a position of the non-V2X entity (e.g., as reported in a previously-received SDSM from a neighboring V2X entity) has changed by a more than a certain distance (e.g., four meters or other distance) or a speed of the non-V2X entity has changed by more than a certain speed threshold (e.g., by more than 45 meters per second or other speed threshold).

According to aspects described herein (e.g., with respect to FIG. 10), modifying (e.g., relaxing) a redundancy reporting mitigation regime can include sending messages more frequently than would be transmitted under the redundancy reporting mitigation regime. In the example of FIG. 10, HV1 determines that HV3 has misreported a third object that is not in a field-of-view (FOV) of RV 1002 (block 1004). In some examples, the misreporting may correspond to the indication, by HV3 806, of a non-existent object. In other examples, the misreporting may correspond with incorrect or inaccurate information (such as location information) for an existing object. In some approaches, in response to the detected misreporting by HV3 806, other wireless devices (e.g., HV1 802 and/or HV2 804) may relax an implemented redundancy mitigation scheme. For example, in response to the identification of HV3 806 as a potentially misbehaving wireless device, HV1 802 and/or HV2 804 may increase a frequency of object reporting (1006) that would have otherwise been less frequent due to redundancy mitigation. By increasing a reporting of objects within the FOV of HV1 802 and/or HV2 804, RV 1002 can receive more frequent updates about objects in the FOV and can make inferences about the misbehavior of various wireless devices in the environment (e.g., HV3 806). For example, if HV1 802 and HV2 804 send regular SDSM/CPM messages about objects in their respective fields-of-view, then the reporting of non-existent objects in the same FOV may be inferred by RV 1002 through a comparison of all received SDSM/CPM object data. In some aspects, such inferences may be based on a comparison of object data from multiple received SDSM/CPM, where RV 1002 can infer the correctness of object information using a majority vote algorithm. For example, RV 1002 may evaluate more frequently reported object data as being more reliable than less frequently reported object data.

In some aspects, modifications to the frequency of object reporting (e.g., relaxing a redundancy mitigation scheme) via SDSM/CPM by a given wireless device may be based on a frequency with which a given object is observed to be reported by other devices. By way of example, if HV1 802 receives reports of an object at a lower reporting frequency, e.g., for a given duration of time, then HV1 802 may add data for the object to an SDSM candidate list, and as a result, report the object in its own SDSM/CPM more frequently. In other aspects, modification to the frequency of object reporting may be based on a distance rule. For example, the frequency of object reporting may be increased for objects observed by originating devices/entities that are further from the ego-vehicle/device.

In some cases, in the event HV1 802 and/or HV2 804 identify the HV3 806 is a misbehaving vehicle, HV1 802, HV2 804, and/or RV 1002 may take appropriate actions, such as according to a misbehavior detection configuration of the devices. For example, the actions can include ignoring and/or filtering out messages from the identified vehicle (e.g., at lower layers of the stack, such as the MAC layer or other lower layer), reporting the misbehaving vehicle to a network-based entity (e.g., a server-based or cloud entity, an SCMS, or other network-based entity) responsible for managing mis-reporting devices (e.g., vehicles or other devices reporting incorrect information in SDSMs, CPMs, or other messages). In one illustrative example, the RV 1002 at block 1008 can ignore messages or specific object reporting from HV3.

In some cases, at block 1010, the HV3 806 detect potential sensor malfunction and/or calibration issues by determining that its sensors are or may be fault. For example, as described above, if messages received by HV3 807 from HV2 804 and/or HV4 808 indicate the actual existence of the reported object or that the location reported by HV3 806 is accurate, HV3 806 may diagnose/identify a failure of one or more of its own sensors or perception capabilities. In the event HV3 806 determines that its sensors are faulty, HV3 806 can recalibrate the one or more faulty sensors and/or can disable the messaging service (e.g., temporarily disabling the SDSM service). In one example, HV3 806 can send an alert (e.g., by displaying the alert, outputting audio with an alert, vibrating a seat, steering wheel, or other component of the vehicle, any combination thereof, and/or outputting other alerts) to a driver of HV3 806 to disable the messaging service (e.g., the SDSM service).

Figure 11:
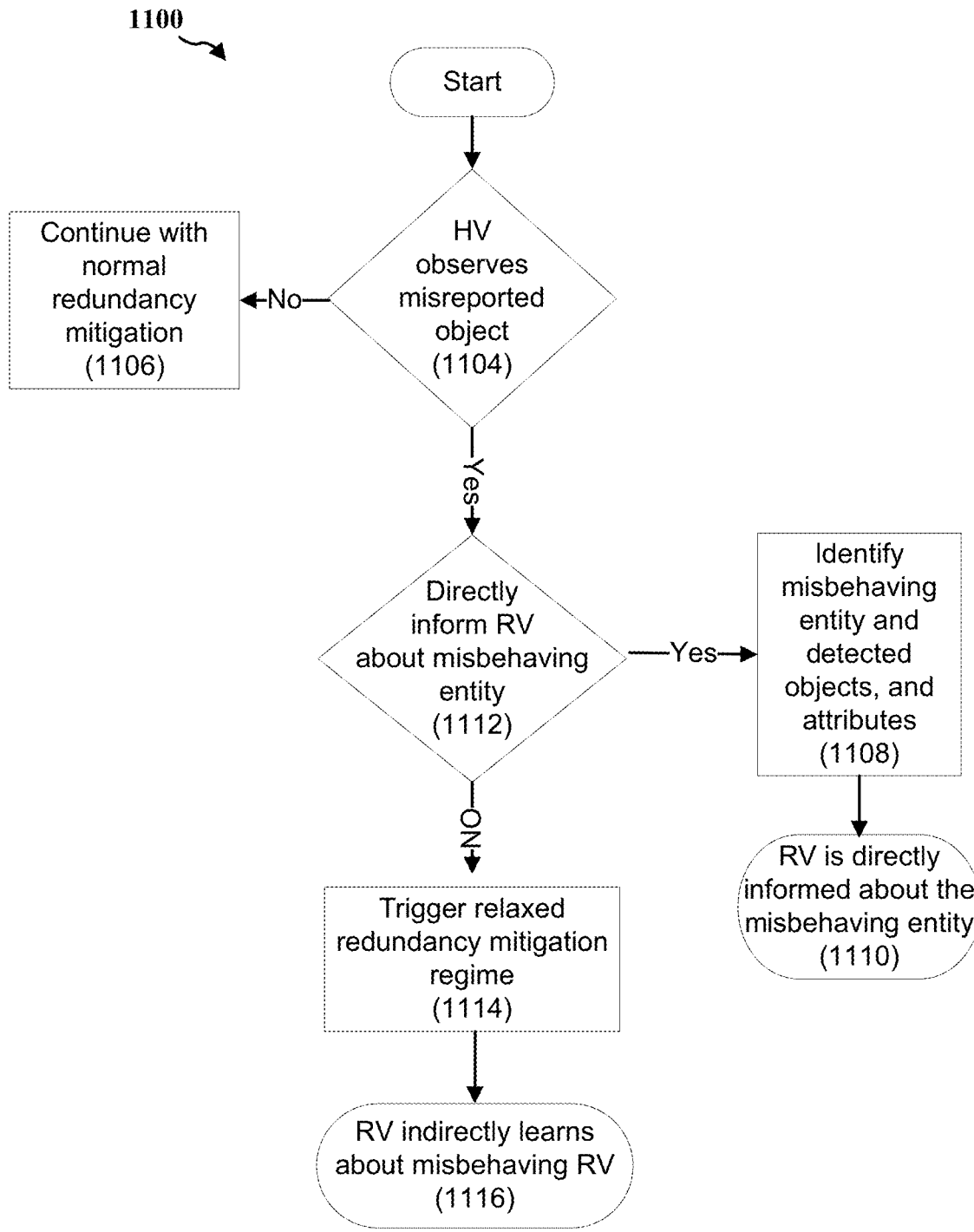
FIG. 11 is a flow diagram illustrating an example processes for notifying a remote vehicle of the presence of a misbehaving entity, in accordance with some aspects of the present disclosure.

FIG. 11 is a flow diagram of example processes 1100 for notifying a remote vehicle of the presence of a misbehaving entity. At block 1104, a host vehicle (or other wireless device) determines if it has observed a misreported object. If no misreported objects are detected, then process 1100 proceeds to block 1106, and the HV proceeds with normal redundancy mitigation (e.g., to reduce possible channel congestion). Alternatively, if the HV observes a misreported object, then process 1100 proceeds to block 1112. At block 1112, the HV can determine whether to directly report the detected misbehavior. If HV decides to directly inform the remote device (RV) of the detected misbehavior, then process 1100 proceeds to block 1108.

At block 1108, the HV identifies the misbehaving entity and detected objects and/or object attributes of the misbehaving entity and/or the detected objects. For instance, the HV can send a message (e.g., an SDSM, CPM, or other message directly to RV at block 1110) including attributes of the misbehaving entity and/or attributes of one or more detected objects. In some aspects, as discussed above, misreported behavior can be indicated in one or more extension fields of SDSM/CPM messages sent by the HV, as illustrated with respect to FIGS. 12 and 13 (described below). In some instances, the attributes of the misreporting (e.g., indicating the nature of the erroneous reporting) can be included in the SDSM/CPM message, either alone, or in conjunction with corrected or accurate object data. In some examples, the attributes can include characteristics of an object detected by the misbehaving vehicle (or other V2X entity) that resulted in the vehicle being classified as misbehaving. For example, the attributes can include an object identifier (ID) identifying the object, an object type indicating a type of the object, one or more locations for the object, a size of the object, a color of the object, and/or other attributes of the nonexistent or incorrectly reported actual object(s). In some cases, the one or more locations for the object can include a "claimed" position of the object claimed by the misbehaving vehicle, the true or actual position of the object, and/or other location. For instance, for a non-existent object, the attributes included in the message can include the "claimed" object location or position (as reported by the misbehaving V2X entity). For incorrect information about an existing object, both the claimed location or position (as reported by the misbehaving V2X entity) and an estimated true object position (e.g., estimated by the sender or originator of the message, such as HV1 802, HV2 804, and/or HV3 806) can be included as attributes in the message. In some cases, for a misbehaving V2X entity to be indicated or marked as misbehaving, it can be required that the misbehaving entity is correctly reporting its own position and possibly a subset of other objects in its neighborhood or vicinity.

In such approaches, RV is directly informed about the misbehaving entity. In such instances, RV can begin to filter/ignore subsequent messages received from the misbehaving entity.

Alternatively, if at block 1112, HV decides not to directly inform RV about the misbehaving entity, then process 1100 proceeds to block 1114, in which a redundancy mitigation regime is relaxed. Relaxation of redundancy mitigation can trigger an increase in the frequency of object reporting by the HV (e.g., as compared to the number of objects that are reported under one or more redundancy mitigation schemes). As discussed above, reporting frequency can be based on a frequency rule relating to the number of times that object observations are reported within a given timeframe. Additionally, reporting frequency by HV can be based on other attributes, such as a distance of message originators from a location of the HV, where reporting frequencies may be increased when message originators are located at larger distances, as opposed to smaller distances.

By increasing reporting frequency (e.g., by relaxing redundancy mitigation), RV is able to receive more frequent SDSM/CPM transmissions, and can make better inferences about the accuracy of received object reporting, as well as any malfeasance by other devices in its environment. At block 1116, the RV can indirectly learn about the misbehaving RV.

Figure 12:
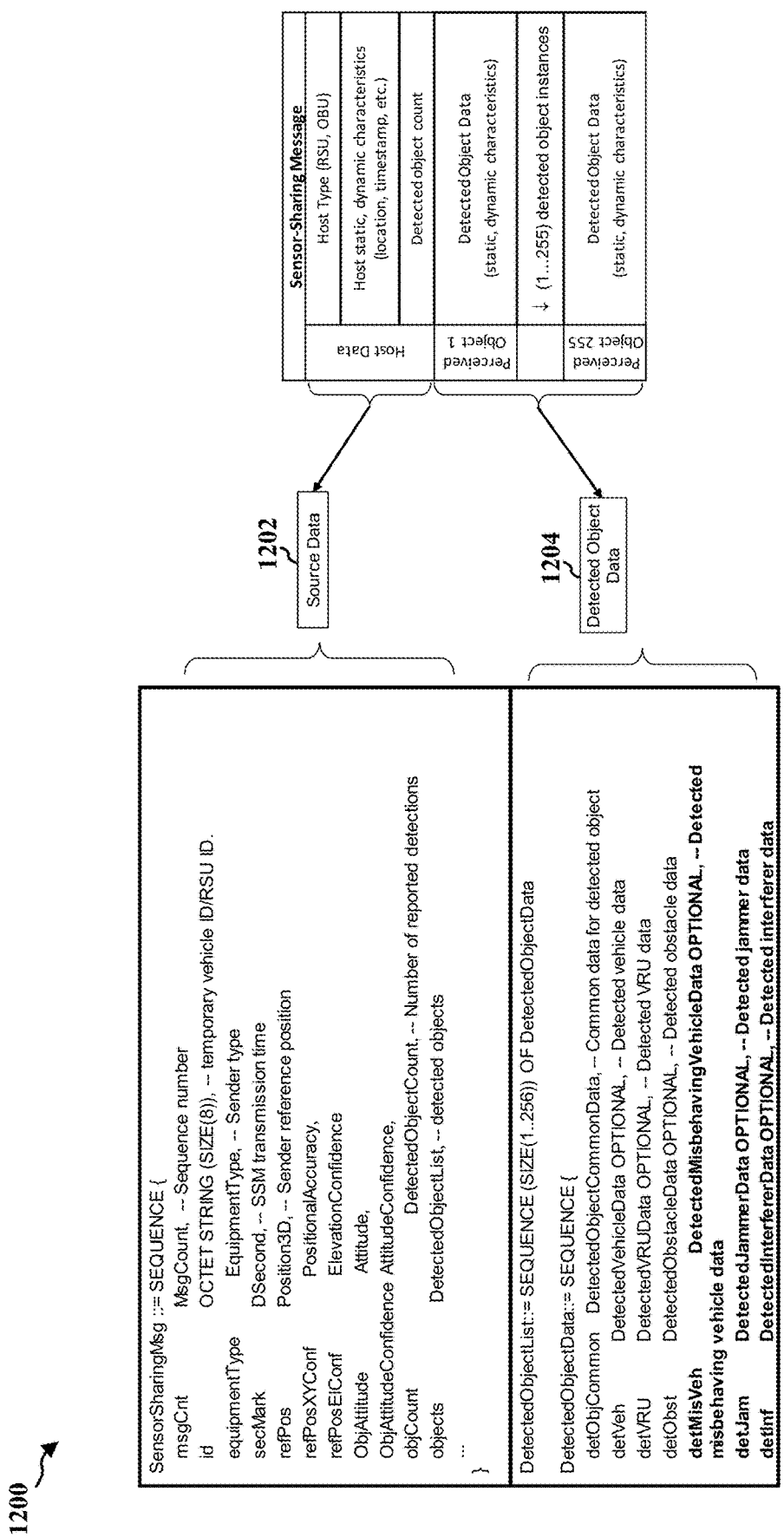
FIGS. 12 and 13 are diagrams illustrating an example of a sensor data sharing message structure, in accordance with some aspects of the present disclosure.
Figure 13:
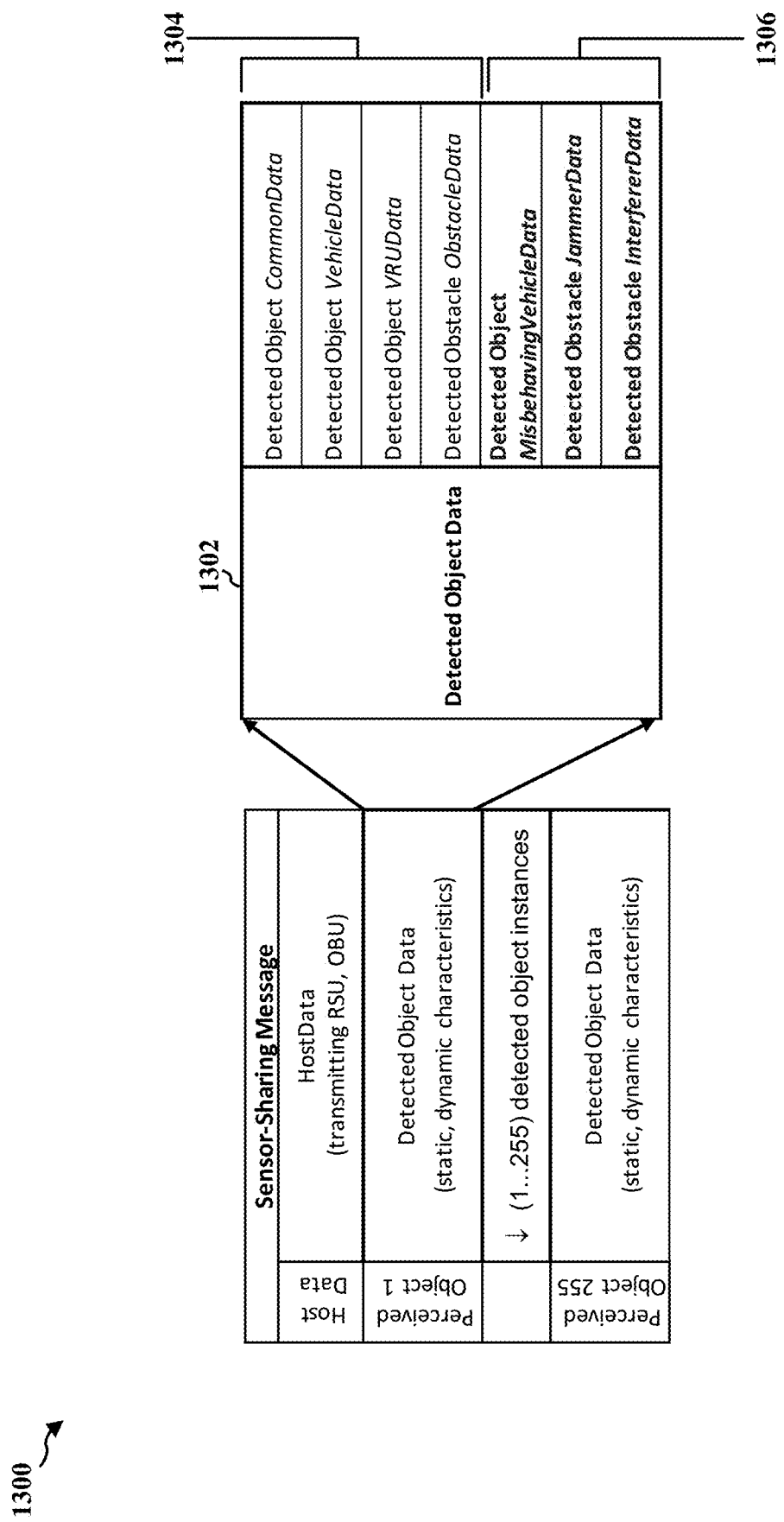

FIG. 12 and FIG. 13 illustrate examples of Sensor Data Sharing Messages (SDSMs). In the example SDSM 1200 illustrated in FIG. 12, source data 1202 may include information related to the reporting device, such as the host vehicle (HV) 806, while detected object data 1204 may include information (e.g., an information element or field labeled "DetectedMisbehavingVehicleData" in FIG. 12) related to an object reported by a misbehaving device, such as information associated with a misreported object and/or object attributes reported by the misbehaving device. For instance, the object data 1204 can include information associated with attributes of a nonexistent object or an incorrectly reported object (e.g., an object reported with incorrect location information) that is reported by the misbehaving vehicle. In one example, in instances where the misbehaving vehicle reports information associated with a non-existent object, the object data 1204 can include information to indicate attributes of the non-existent object, such as the incorrectly claimed object location, object type, and/or other information. In instances where the misbehaving vehicle incorrectly reports information associated with an existing object (e.g., an incorrect location, etc.), the object data 1204 can include information identifying the correct attributes, information indicating the incorrect attributes that were erroneously reported by the misbehaving device, and/or other information. For example, in such instances, the object data 1204 can include information identifying the actual (correct) object location determined by a particular HV (e.g., the HV 806) reporting the object data 1204, the incorrect or claimed object location reported by the misbehaving vehicle or device, and/or other information. In some examples, the object data 1204 may include true/correct information about other object attributes, as well as one or more corresponding (claimed) attributes that are incorrectly reported by the misbehaving device. For example, object data 1204 may include actual (correct) and/or claimed (incorrect) attribute information regarding one or more of an object ID identifying the object, an object type indicating a type of the object, a size of the object, a color of the object, and/or other attributes of the nonexistent or incorrectly reported actual object(s).

With reference to diagram 1300 of FIG. 13, the detected object data 1302 may include data relating to physical obstacles 1304 (e.g., potholes, VRU, non-V2X vehicles), and may also include data 1306 relating to attributes of a nonexistent object or an incorrectly reported object (e.g., an object reported with incorrect timing and/or location information) that is reported by the misbehaving vehicle.

Figure 14:
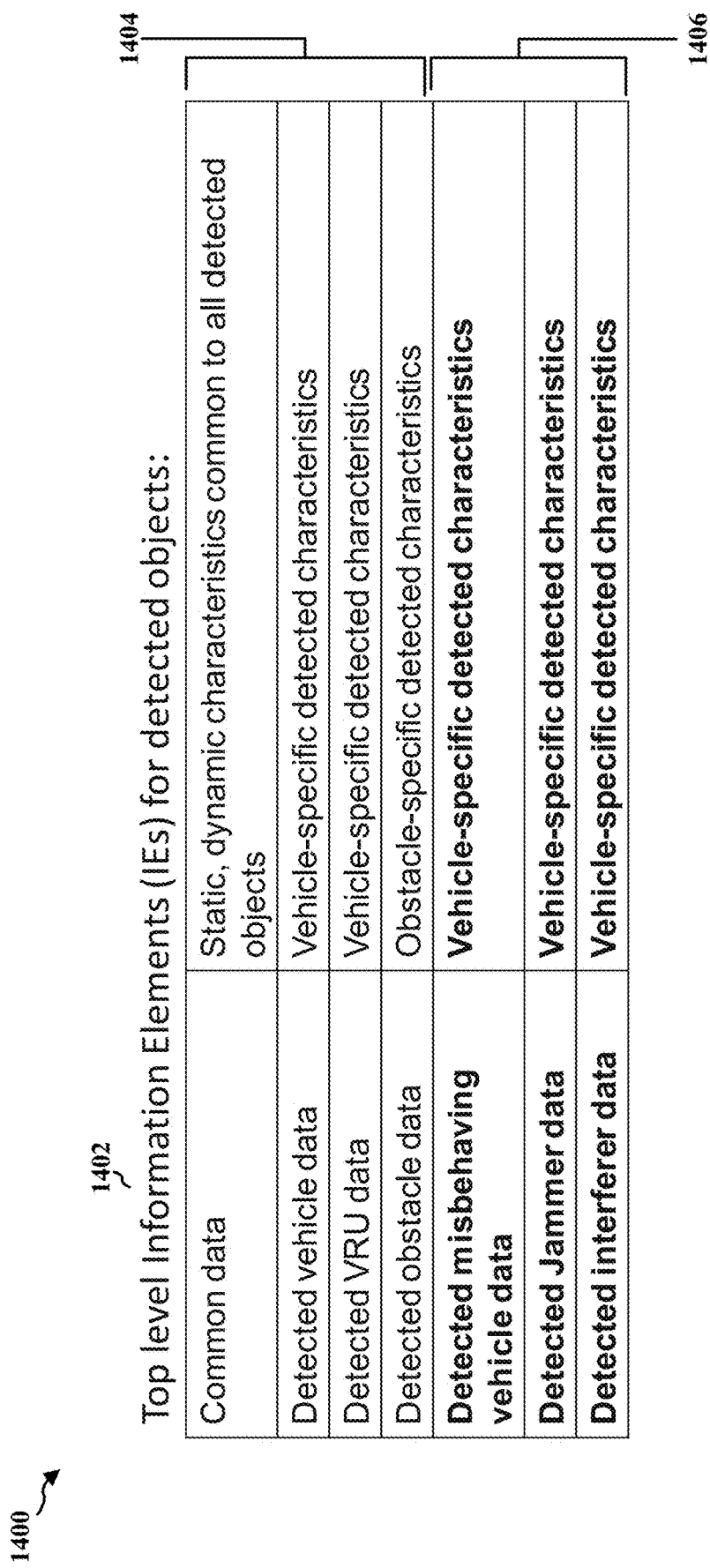
FIG. 14 is a diagram illustrating an example of information elements for detected objects in sensor data sharing message, in accordance with some aspects of the present disclosure.

FIG. 14 is a diagram illustrating an example of information elements for detected objects in a sensor data sharing message, such as the sensor data sharing message of FIG. 12 and FIG. 13. With reference to diagram 1400 of FIG. 14, top level information elements (IE) 1402 for detected objects may include specific detected characteristics of the detected object. For example, data elements 1404 may include non-V2X vehicle data, VRU data, physical obstacle data, while data elements 1406 may include misbehaving vehicle data.

Figure 15:
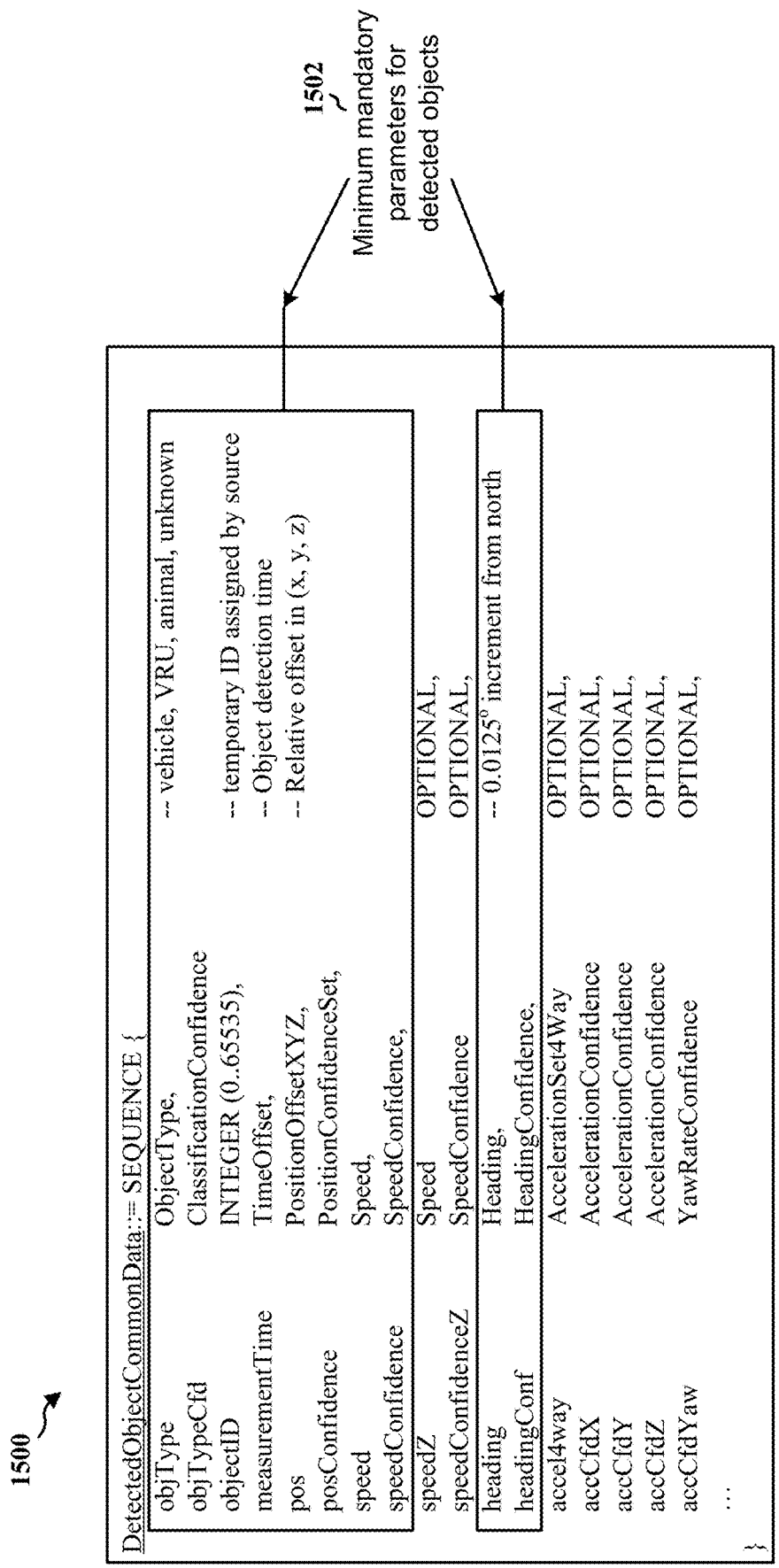
FIG. 15 is a diagram illustrating an example of parameters for detected objects in sensor data sharing messages, in accordance with some aspects of the present disclosure.

FIG. 15 is a diagram illustrating an example of parameters for detected objects in sensor data sharing messages, such as the sensor data sharing message of FIG. 12 and FIG. 13. For instance, the diagram 1500 of FIG. 15 provides an example of parameters 1502 of detected objects. For example, the parameters 1502 may include the position, speed, and heading of a detected object. For a DoS attack, the parameters 1502 may include the position, speed, or heading.

Figure 16:
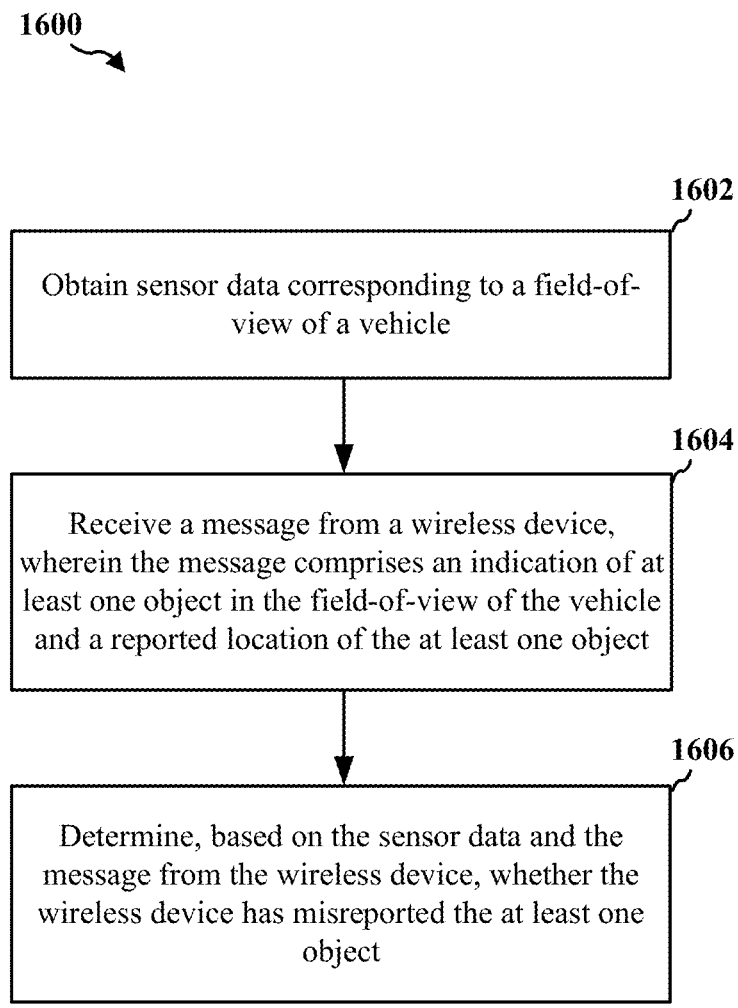
FIG. 16 is a flow diagram of an example process for validating a detected object, in accordance with some aspects of the present disclosure.

FIG. 16 is a flow diagram of an example process 1600 for validating a detected object. At block 1602, the process 1600 includes obtaining sensor data corresponding to a field-of-view (FOV) of a vehicle. As discussed above, the sensor data can include data received from a number of sensors, including but not limited to one or more: LiDAR sensors, radar sensors, cameras, and/or accelerometers. In some aspects, the sensor data can include data corresponding to an environment around the collecting apparatus (vehicle), such as objects that are proximate to the vehicle.

At block 1604, the process 1600 includes receiving a message from a wireless device, wherein the message includes an indication of at least one object (e.g., a reported object) that is located in the FOV of the vehicle. In some aspects, the message can be received using a V2X communication protocol. In some aspects, the message may be (or may include) one or more SDSM/CPM transmissions.

At block 1606, the process 1600 includes determining, based on the sensor data and the message from the wireless device, whether the wireless device has misreported the at least one object. In some aspects, validating the existence or accuracy (e.g., location and/or description) of the object includes the comparison of sensor data corresponding with the reported object with the object data contained in the received message. By way of example, it may be determined that the object is not represented in the sensor data obtained by the vehicle. In such instances, the wireless device may be classified as a misbehaving device. In another example, it may be determined that the object is represented in the sensor data, in which case various attributes (such as location) of the reported object may be compared with those learned from the sensor data. In some aspects, the wireless device may be classified as a misbehaving object if the reported object attributes differ significantly from those indicated by the sensor data. For example, the wireless device may be classified as a misbehaving device if the reported location of the object differs from that indicated by the sensor data by an amount that exceeds a predetermined threshold.

In some examples, once the wireless device has been classified as a misbehaving device, it is directly reported e.g., to one or more other devices, such as one or more RSUs or other vehicles. By way of example, data indicating the malfeasance of the wireless device may be included in an extension field of a Sensor Data Sharing Message (SDSM)/Collective Perception Message (CPM), and/or a Basic Safety Message (BSM), or the like.

In some examples, the detection of the misbehaving wireless device may trigger changes to a frequency of object reporting performed by the vehicle. For example, the vehicle may increase a frequency of object reporting via SDSM, e.g., by relaxing a redundancy mitigation regime.

Figure 17:
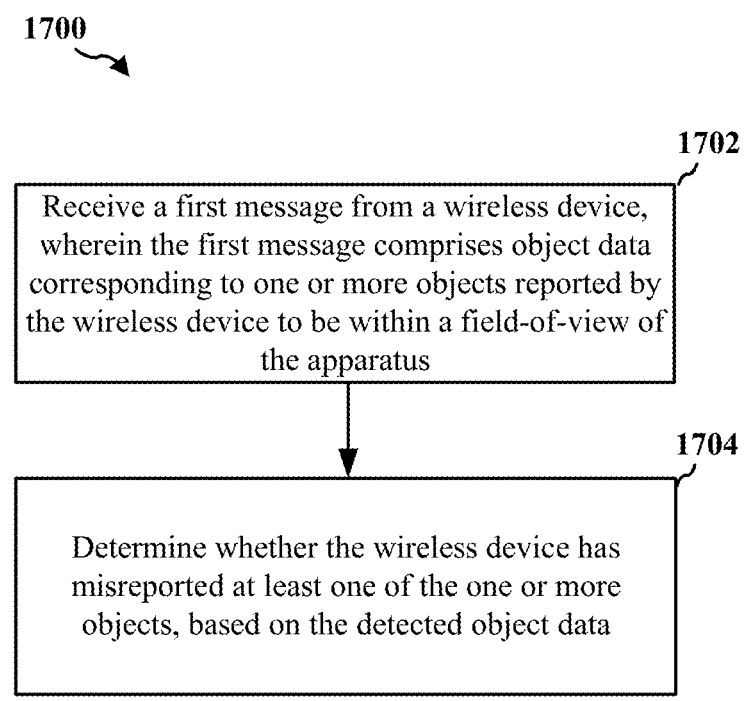
FIG. 17 is a flow diagram of an example process for validating a detected object, in accordance with some aspects of the present disclosure.

FIG. 17 is a flow diagram of an example process 1700 for validating a detected object. At block 1702, the process 1700 includes receiving a first message from a wireless device, wherein the first message comprises object data corresponding to one or more objects reported by the wireless device to be within a field-of-view of the apparatus.

At block 1704, the process 1700 includes determining whether the wireless device has misreported at least one of the one or more objects based on the detected data. As discussed above, the message received from the wireless device (e.g., the first message) can be, or can include, a Sensor Data Sharing Message (SDSM). In some aspects, the apparatus (e.g., the vehicle) can transmit a second (SDSM) message indicating that the wireless device has misreported at least one of the one or more objects. In some aspects, the second message can be send to a remote vehicle (RV), such as RV 702, and RV 902 discussed above with respect to FIGS. 7 and 9. In some aspects, data indicating the misreporting by the wireless device can be included in at least one SDSM extension field of the second message. By way of example, the data may include information indicating an identity of the wireless device, a location of the wireless device, and/or information about the erroneous reporting of the wireless device, as discussed above with respect to FIGS. 13, 14, and 15, discussed above. In some examples, the object data included in the second message can include data identifying one or more of: a Vulnerable Road User (VRU), a physical obstacle, a wireless obstacle, a detected vehicle, or any combination thereof.

Figure 18:
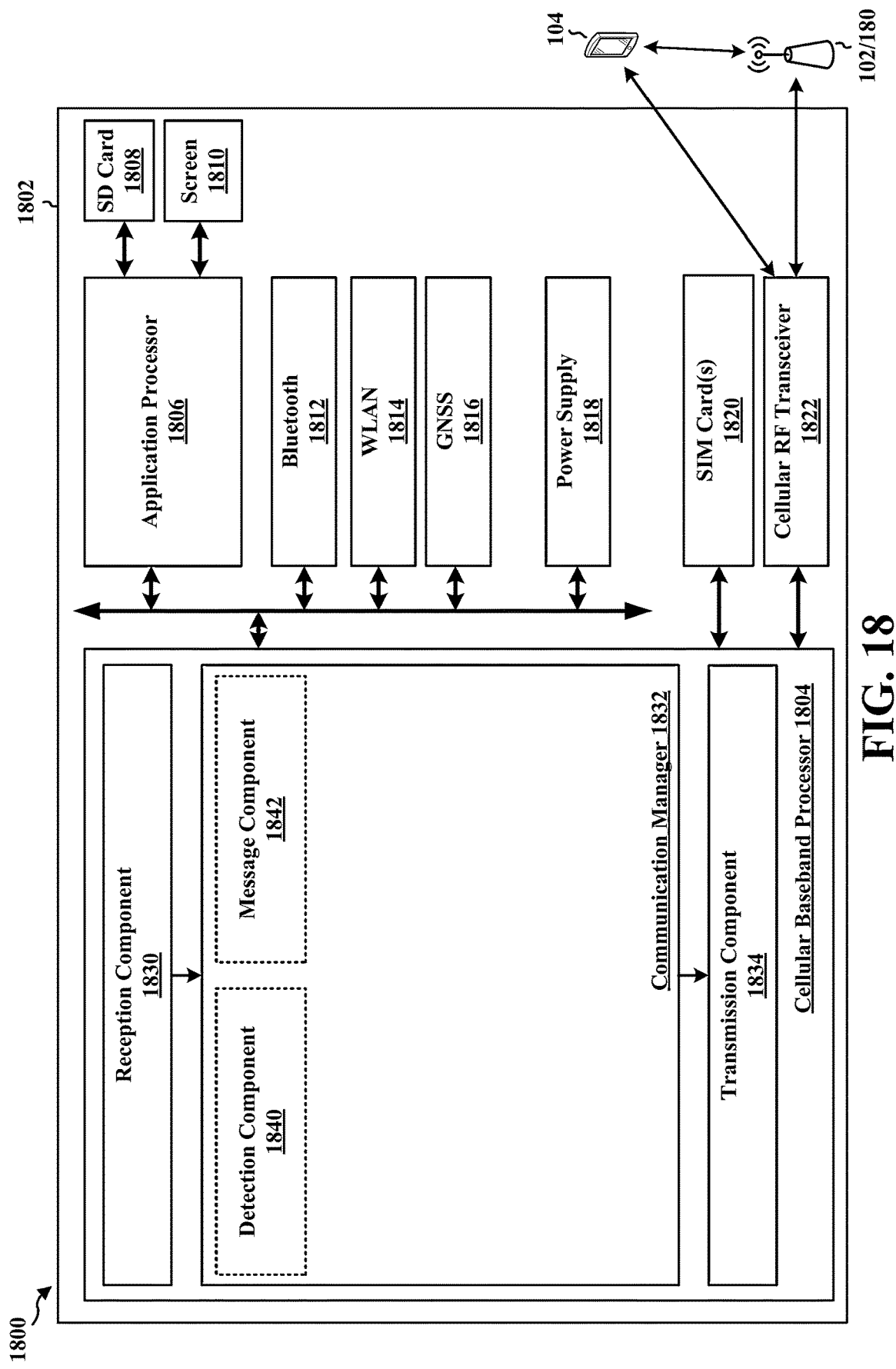
FIG. 18 is a diagram illustrating an example of a hardware implementation for an example apparatus, in accordance with some aspects of the present disclosure.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a GNSS module 1816, and a power supply 1818. The GNSS module 1816 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components, including a detection component 1840 configured to detect one or more objects and a message component 1842 configured to generate one or more messages (e.g., SDSMs, CPMs, BSMs, etc.). The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the aforediscussed additional modules of the apparatus 1802.

The apparatus may include additional components that perform each of the blocks of the algorithm in the aforementioned flowcharts of FIG. 16 or 17. As such, each block in the aforementioned flowcharts of FIG. 16 or 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving, from a first wireless device, a message indicating a threat entity within a threat zone. The threat entity transmits data that interferes with transmission of BSMs. The apparatus includes means for determining a candidate resource of a set of candidate resources on which to transmit a BSM based at least in part on the message indicating information related to the threat entity from the first wireless device. The apparatus includes means for transmitting, to at least a third wireless device, the BSM on a determined candidate resource. The apparatus further includes means for excluding one or more candidate resources in the set of candidate resources based on a projected RSRP for each candidate resource in the set of candidate resources exceeding an RSRP threshold to determine a first subset of candidate resources. The apparatus further includes means for ranking the first subset of candidate resources based on a weighted RSSI ranking to obtain a second subset of candidate resources with a lowest weighted RSSI. The second subset of candidate resources is a portion of the first subset of candidate resources. The apparatus further includes means for selecting a candidate resource from the second subset of candidate resources. The apparatus further includes means for excluding one or more virtually sensed candidate resources in the set of candidate resources having an RSSI that exceeds a pre-filter threshold to obtain a filtered subset of candidate resources that do not exceed the pre-filter threshold. The apparatus further includes means for excluding candidate resources within the filtered subset of candidate resources that do not exceed the pre-filter threshold that exceed an RSRP threshold to obtain a second subset of candidate resources that do not exceed the RSRP threshold. The apparatus further includes means for selecting the candidate resource from the second subset of candidate resources. The aforementioned means may be one or more of the aforementioned components of the apparatus 1802 configured to perform the functions recited by the aforementioned means.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for validating object detection, the apparatus comprising: at least one transceiver; at least one memory; and at least one processor coupled to the at least one transceiver and the at least one memory, the at least one processor configured to: receive via the at least one transceiver, a first message from a wireless device, wherein the first message comprises object data corresponding to one or more objects reported by the wireless device to be within a field-of-view of the apparatus; and determine, based on the object data, whether the wireless device has misreported at least one of the one or more objects.

Aspect 2: The apparatus of Aspect 1, wherein the first message is a Sensor Data Sharing Message (SDSM).

Aspect 3: The apparatus of any of Aspects 1 or 2, wherein the at least one processor is configured to: transmit, via the at least one transceiver to a remote vehicle, a second message indicating that the wireless device has misreported at least one of the one or more objects.

Aspect 4: The apparatus of Aspect 3, wherein at least one extension field of the second message comprises an identity of the wireless device.

Aspect 5: The apparatus of any of Aspects 3 or 4, wherein at least one extension field of the second message comprises object data corresponding to one or more objects detected by the apparatus from collected sensor data.

Aspect 6: The apparatus of Aspect 5, wherein the object data corresponding to the one or more objects detected by the apparatus comprises data identifying at least one of a Vulnerable Road User (VRU), a physical obstacle, a wireless obstacle, a detected vehicle, or any combination thereof.

Aspect 7: The apparatus of any of Aspects 1 to 6, wherein the one or more objects reported by the wireless device are not included among one or more objects detected by the apparatus from collected sensor data.

Aspect 8: The apparatus of Aspect 7, wherein the sensor data comprises data collected from one or more: Light Detection and Ranging (LiDAR) sensors, radar sensors, camera sensors, or a combination thereof.

Aspect 9: The apparatus of any of Aspects 1 to 8, wherein the apparatus is a vehicle.

Aspect 10: The apparatus of any of Aspects 1 to 9, wherein the apparatus is a wireless device.

Aspect 11: A method for validating object detection, the method comprising: receiving a first message from a wireless device, wherein the first message comprises object data corresponding to one or more objects reported by the wireless device to be within a field-of-view of an apparatus; and determining, based on the object data, whether the wireless device has misreported at least one of the one or more objects.

Aspect 12: The method of Aspect 11, wherein the first message is a Sensor Data Sharing Message (SDSM).

Aspect 13: The method of any of Aspects 11 or 12, further comprising: transmitting a second message indicating that the wireless device has misreported at least one of the one or more objects.

Aspect 14: The method of Aspect 13, wherein at least one extension field of the second message comprises an identity of the wireless device.

Aspect 15: The method of any of Aspects 13 or 14, wherein at least one extension field of the second message comprises object data corresponding to one or more objects detected by the apparatus from collected sensor data.

Aspect 16: The method of Aspect 15, wherein the object data corresponding to the one or more objects detected by the apparatus comprises data identifying at least one of a Vulnerable Road User (VRU), a physical obstacle, a wireless obstacle, a detected vehicle, or any combination thereof.

Aspect 17: The method of any of Aspects 11 to 16, wherein the one or more objects reported by the wireless device are not included among one or more objects detected by the apparatus from collected sensor data.

Aspect 18: The method of Aspect 17, wherein the sensor data comprises data collected from one or more: Light Detection and Ranging (LiDAR) sensors, radar sensors, camera sensors, or a combination thereof.

Aspect 19: The method of any of Aspects 11 to 18, wherein the apparatus is a vehicle.

Aspect 20: The method of any of Aspects 11 to 19, wherein the apparatus is a wireless device.

Aspect 21: A non-transitory computer-readable storage medium comprising at least one instruction for causing a computer or processor to perform operations according to any of Aspects 1 to 20.

Aspect 22: An apparatus for validating object detection, the apparatus comprising: means for performing operations according to any of Aspects 1 to 20.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for validating object detection, the apparatus comprising:
    at least one transceiver;
    at least one memory; and
    at least one processor coupled to the at least one transceiver and the at least one memory, the at least one processor configured to:
        receive, via the at least one transceiver, a first message from a wireless device, wherein the first message comprises object data corresponding to one or more objects reported by the wireless device to be within a field-of-view of the apparatus, the object data comprising a location of an object of the one or more objects;
        determine, based on the object data, the wireless device has misreported the location of the object of the one or more objects; and
        transmit, via the at least one transceiver to a remote vehicle, a second message indicating that the wireless device has misreported the location of the object, the second message comprising a detected location of the object and the misreported location of the object included in the first message, wherein the remote vehicle is different from the wireless device.

2. The apparatus of claim 1, wherein the first message is a Sensor Data Sharing Message (SDSM).

3. The apparatus of claim 1, wherein at least one extension field of the second message comprises an identity of the wireless device.

4. The apparatus of claim 1, wherein at least one extension field of the second message comprises object data corresponding to one or more objects detected by the apparatus from collected sensor data.

5. The apparatus of claim 4, wherein the object data corresponding to the one or more objects detected by the apparatus comprises data identifying at least one of a Vulnerable Road User (VRU), a physical obstacle, a wireless obstacle, a detected vehicle, or any combination thereof.

6. The apparatus of claim 1, wherein the one or more objects reported by the wireless device are not included among one or more objects detected by the apparatus from collected sensor data.

7. The apparatus of claim 6, wherein the sensor data comprises data collected from one or more: Light Detection and Ranging (LiDAR) sensors, radar sensors, camera sensors, or a combination thereof.

8. The apparatus of claim 1, wherein the apparatus is a vehicle.

9. The apparatus of claim 1, wherein the apparatus is a wireless device.

10. The apparatus of claim 1, wherein the at least one processor is configured to:
    detect the detected location of the object.

11. A method for validating object detection, the method comprising:
    receiving a first message from a wireless device, wherein the first message comprises object data corresponding to one or more objects reported by the wireless device to be within a field-of-view of an apparatus, the object data comprising a location of an object of the one or more objects;
    determining, based on the object data, the wireless device has misreported the location of the object of the one or more objects; and
    transmitting, to a remote vehicle, a second message indicating that the wireless device has misreported the location of the object, the second message comprising a detected location of the object and the misreported location of the object included in the first message, wherein the remote vehicle is different from the wireless device.

12. The method of claim 11, wherein the first message is a Sensor Data Sharing Message (SDSM).

13. The method of claim 11, wherein at least one extension field of the second message comprises an identity of the wireless device.

14. The method of claim 11, wherein at least one extension field of the second message comprises object data corresponding to one or more objects detected by the apparatus from collected sensor data.

15. The method of claim 14, wherein the object data corresponding to the one or more objects detected by the apparatus comprises data identifying at least one of a Vulnerable Road User (VRU), a physical obstacle, a wireless obstacle, a detected vehicle, or any combination thereof.

16. The method of claim 11, wherein the one or more objects reported by the wireless device are not included among one or more objects detected by the apparatus from collected sensor data.

17. The method of claim 16, wherein the sensor data comprises data collected from one or more: Light Detection and Ranging (LiDAR) sensors, radar sensors, camera sensors, or a combination thereof.

18. The method of claim 11, wherein the apparatus is a vehicle.

19. The method of claim 11, wherein the apparatus is a wireless device.

20. The method of claim 11, further comprising:
detecting the detected location of the object.

21. A non-transitory computer-readable storage medium comprising at least one instruction for causing a computer or processor to:
receive a first message from a wireless device, wherein the first message comprises object data corresponding to one or more objects reported by the wireless device to be within a field-of-view of an apparatus, the object data comprising a location of an object of the one or more objects;
determine, based on the object data, the wireless device has misreported the location of the object of the one or more objects; and
transmit, to a remote vehicle, a second message indicating that the wireless device has misreported the location of the object, the second message comprising a detected location of the object and the misreported location of the object included in the first message, wherein the remote vehicle is different from the wireless device.

22. The non-transitory computer-readable storage medium of claim 21, wherein the first message is a Sensor Data Sharing Message (SDSM).

23. The non-transitory computer-readable storage medium of claim 21, wherein at least one extension field of the second message comprises an identity of the wireless device.

24. The non-transitory computer-readable storage medium of claim 21, wherein at least one extension field of the second message comprises object data corresponding to one or more objects detected by the apparatus from collected sensor data.

25. The non-transitory computer-readable storage medium of claim 24, wherein the object data corresponding to the one or more objects detected by the apparatus comprises data identifying at least one of a Vulnerable Road User (VRU), a physical obstacle, a wireless obstacle, a detected vehicle, or any combination thereof.

26. The non-transitory computer-readable storage medium of claim 21, wherein the one or more objects reported by the wireless device are not included among one or more objects detected by the apparatus from collected sensor data.

27. The non-transitory computer-readable storage medium of claim 26, wherein the sensor data comprises data collected from one or more: Light Detection and Ranging (LiDAR) sensors, radar sensors, camera sensors, or a combination thereof.

28. The non-transitory computer-readable storage medium of claim 21, wherein the apparatus is a vehicle.

29. An apparatus for validating object detection, comprising:
means for receiving a first message from a wireless device, wherein the first message comprises object data corresponding to one or more objects reported by the wireless device to be within a field-of-view of the apparatus, the object data comprising a location of an object of the one or more objects;
means for determining, based on the object data, the wireless device has misreported the location of the object of the one or more objects; and
means for transmitting, to a remote vehicle, a second message indicating that the wireless device has misreported the location of the object, the second message comprising a detected location of the object and the misreported location of the object included in the first message, wherein the remote vehicle is different from the wireless device.

* * * * *